United States Patent
Min et al.

(10) Patent No.: US 9,445,480 B2
(45) Date of Patent: Sep. 13, 2016

(54) LIGHTING SYSTEM, LIGHTING APPARATUS, AND LIGHTING CONTROL METHOD

(71) Applicant: LG ELECTRONICS INC., Seoul (KR)

(72) Inventors: Youjoo Min, Seoul (KR); Jooyeon Kim, Seoul (KR); Jisun Lee, Seoul (KR); Jisook Lee, Seoul (KR); Grami Ryu, Seoul (KR); Moonsung Kim, Seoul (KR); Jeonghwa Yang, Seoul (KR); Jongsun Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 418 days.

(21) Appl. No.: 13/834,882

(22) Filed: Mar. 15, 2013

(65) Prior Publication Data
US 2013/0271004 A1 Oct. 17, 2013

Related U.S. Application Data

(60) Provisional application No. 61/746,573, filed on Dec. 28, 2012.

(30) Foreign Application Priority Data

Apr. 12, 2012 (KR) .................. 10-2012-0038068
Apr. 12, 2012 (KR) .................. 10-2012-0038069

(51) Int. Cl.
*H05B 37/02* (2006.01)
*H05B 33/08* (2006.01)
*G08C 17/02* (2006.01)

(52) U.S. Cl.
CPC ........... *H05B 37/0227* (2013.01); *G08C 17/02* (2013.01); *H05B 33/0842* (2013.01); *H05B 37/0272* (2013.01); *G08C 2201/40* (2013.01); *G08C 2201/93* (2013.01)

(58) Field of Classification Search
CPC .......... H05B 33/0842; H05B 37/0727; G08C 17/02
See application file for complete search history.

(56) References Cited

U.S. PATENT DOCUMENTS

2009/0122086 A1 5/2009 Diederiks et al.
2009/0284187 A1 11/2009 Diederiks et al.
(Continued)

FOREIGN PATENT DOCUMENTS

JP 2005-151507 6/2005
JP 2009504000 A 1/2009
(Continued)

OTHER PUBLICATIONS

European Search Report dated Dec. 5, 2013 for corresponding Application No. 13160549.5.
(Continued)

*Primary Examiner* — Patrick O'Neill
(74) *Attorney, Agent, or Firm* — Ked & Associates, LLP

(57) ABSTRACT

Provided is a lighting apparatus and a method for controlling the same using a mobile device. A lighting system may include a mobile terminal, a hub configured to communicate with the mobile terminal, and an LED lamp configured to communicate with the hub. The mobile terminal may be configured to display an image captured or focused using a camera at the mobile terminal. The mobile terminal may transfer to the hub information corresponding to a selection of a region of the image. The hub may provide a wireless signal corresponding to the information received from the mobile terminal for changing a color of light emitted by the LED lamp. The LED lamp may be controlled based on the ZigBee communication protocol.

10 Claims, 29 Drawing Sheets

(56) References Cited

U.S. PATENT DOCUMENTS

| | | | |
|---|---|---|---|
| 2010/0171933 A1* | 7/2010 | Kim et al. | 353/31 |
| 2010/0244708 A1 | 9/2010 | Cheung et al. | |
| 2011/0312311 A1 | 12/2011 | Abifaker et al. | |
| 2011/0312422 A1 | 12/2011 | Ackley | |
| 2013/0050233 A1* | 2/2013 | Hirsch | 345/589 |

FOREIGN PATENT DOCUMENTS

| | | |
|---|---|---|
| KR | 10-2006-0032417 | 4/2006 |
| KR | 10-2007-0018601 A | 2/2007 |
| KR | 10-2009-0047323 | 5/2009 |
| KR | 10-2009-0082828 | 7/2009 |
| KR | 10-2011-0118783 A | 11/2011 |

OTHER PUBLICATIONS

European Search Report issued in related Application No. 14186088.2 dated Feb. 4, 2015.

European Search Report issued in related Application No. 15152678.7 dated Jun. 10, 2015.

* cited by examiner

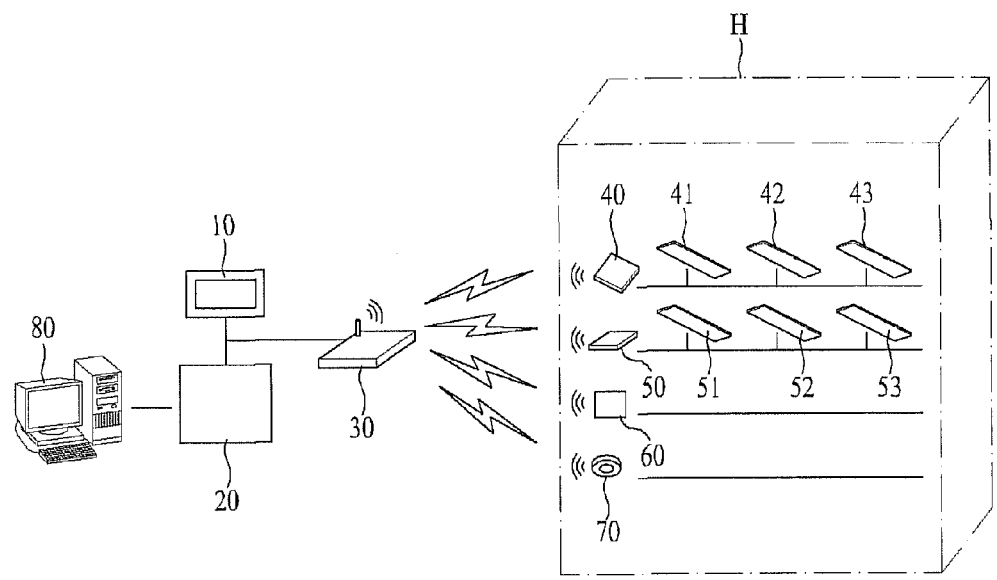

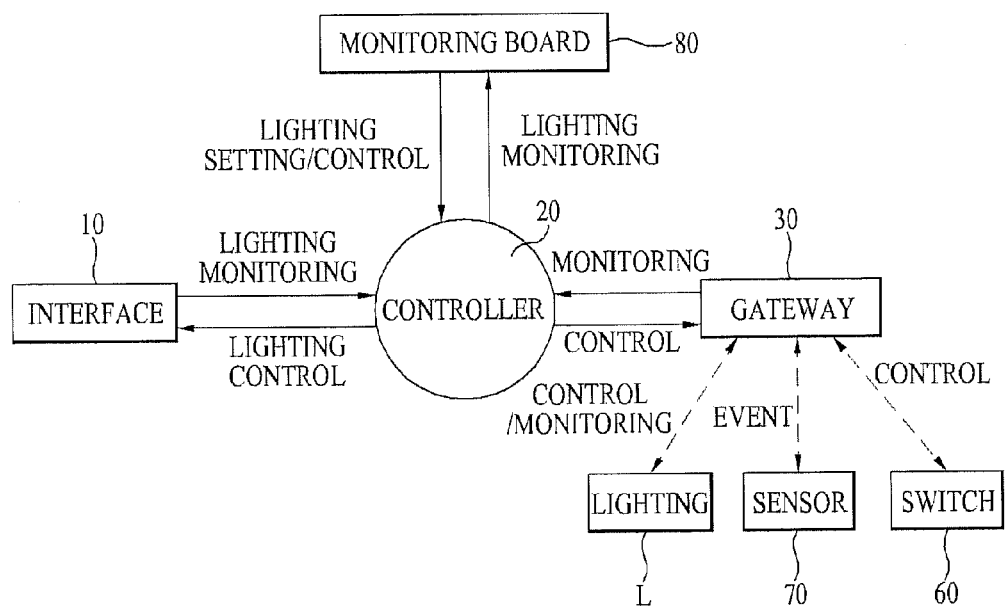

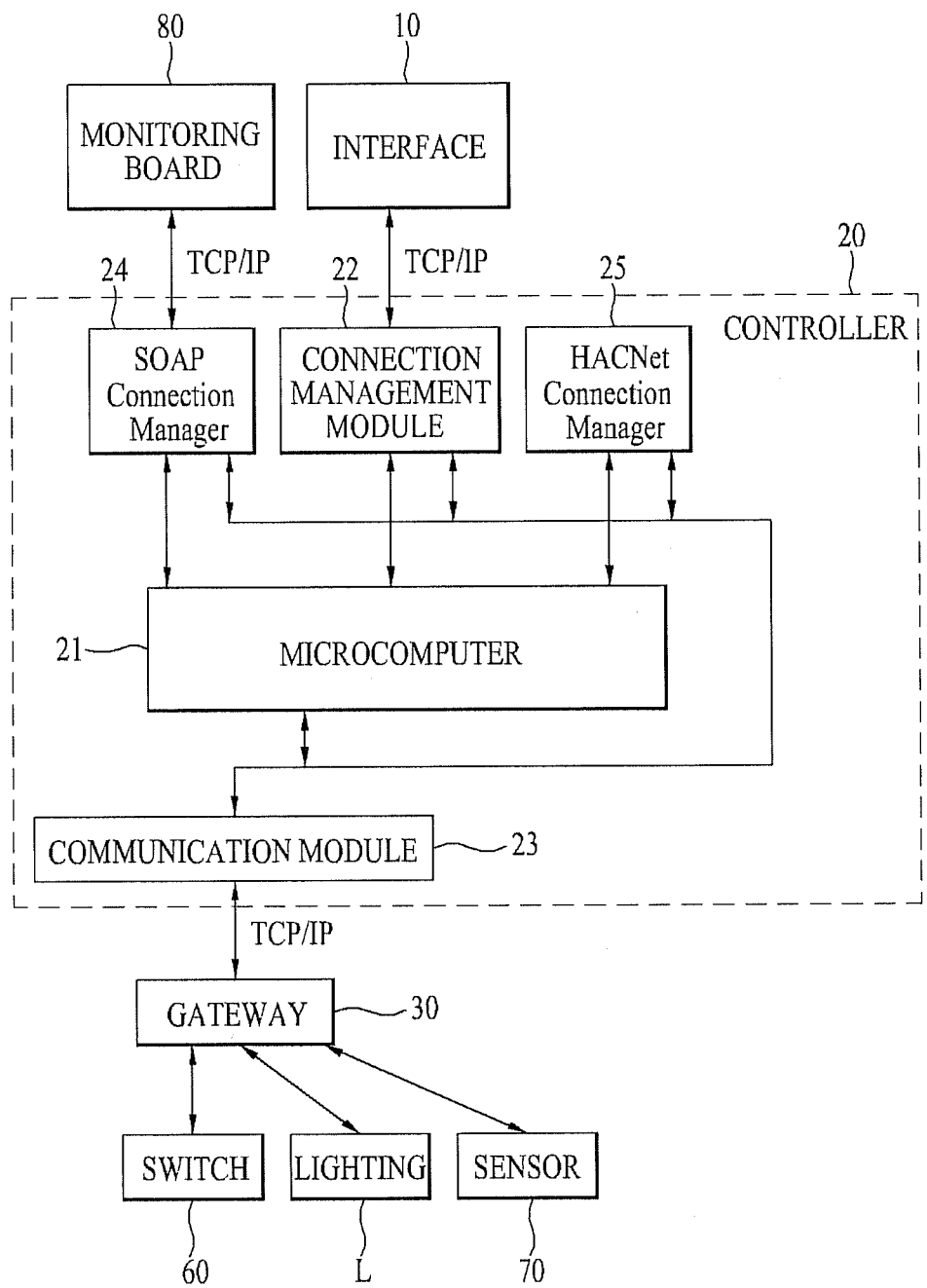

FIG. 3C
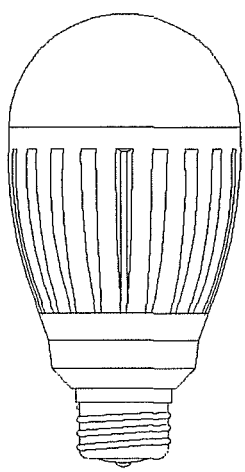
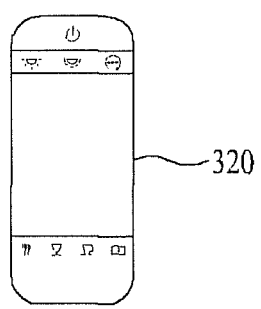

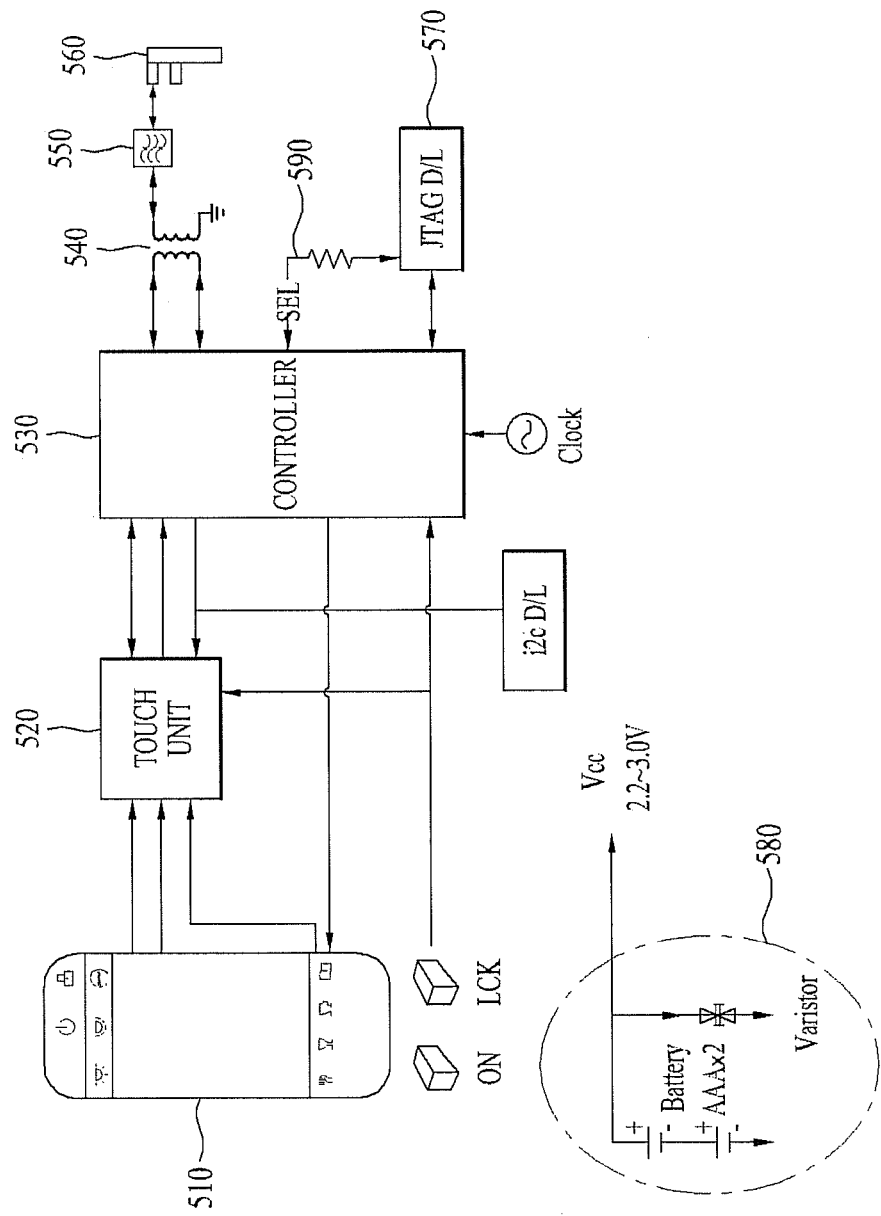

FIG. 7
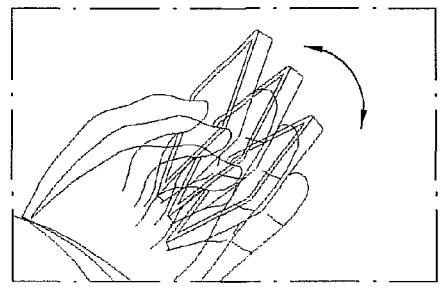
(a)
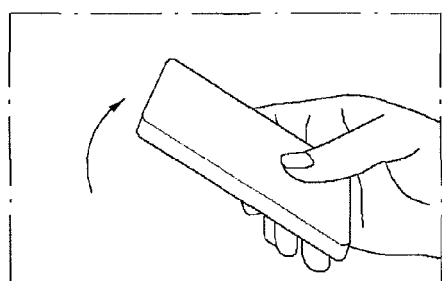
(b)
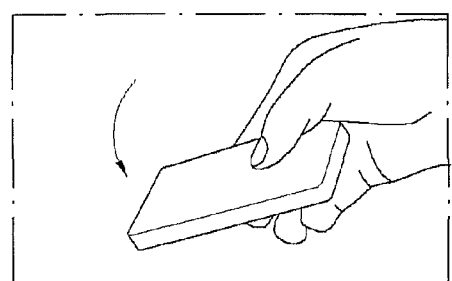
(c)
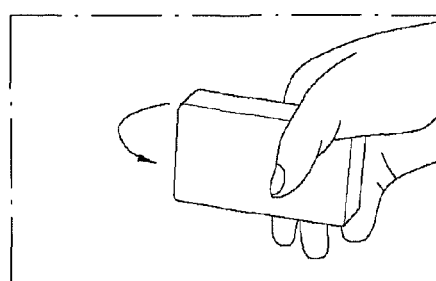
(d)
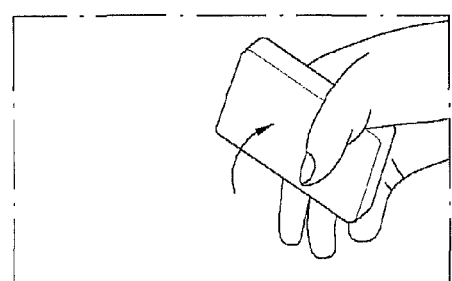
(e)

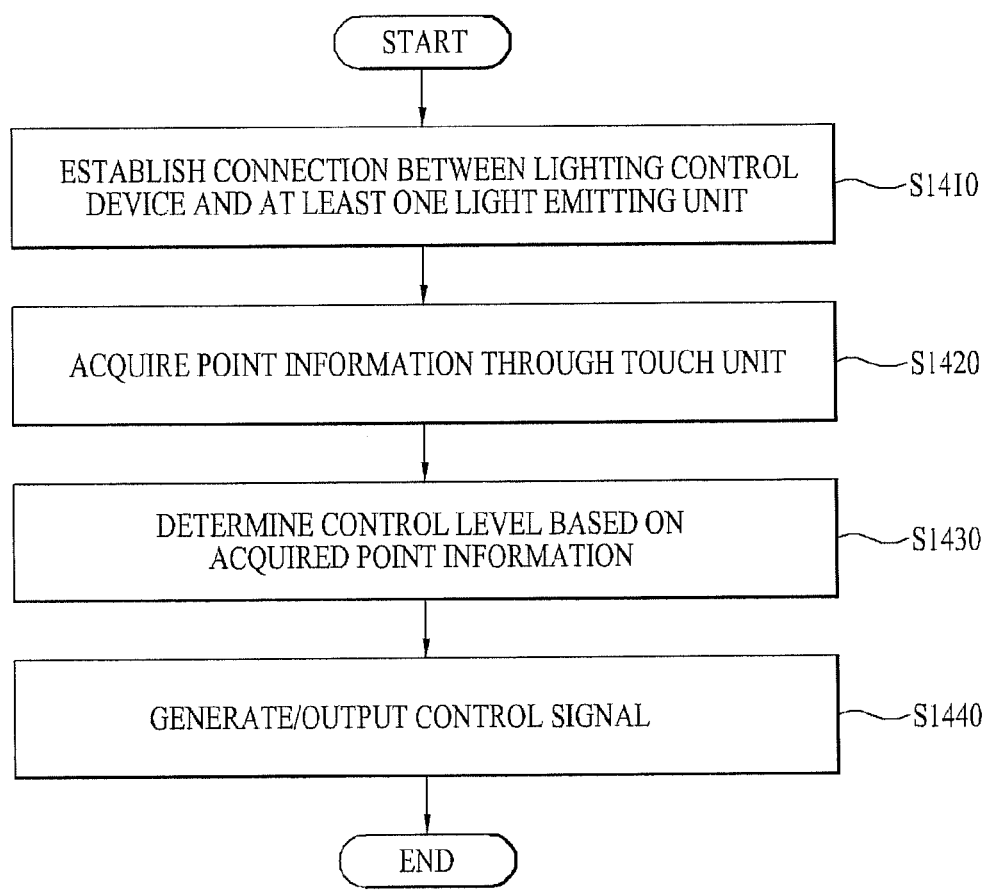

FIG. 17
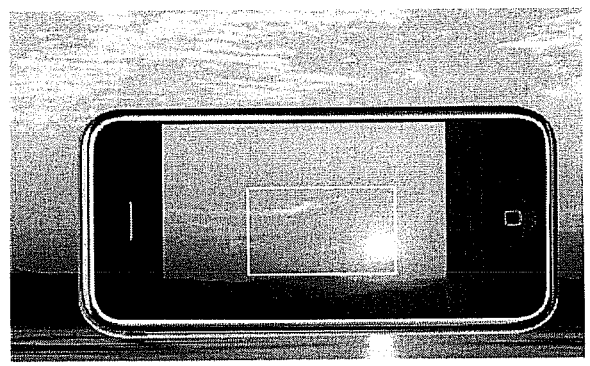
(a)
  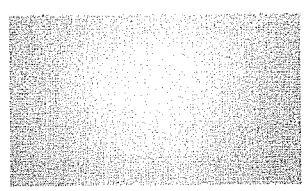  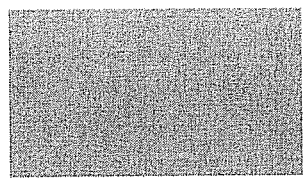
(b)　　　　　　　　(c)　　　　　　　　(d)

FIG. 18
 
(a)                                        (b)

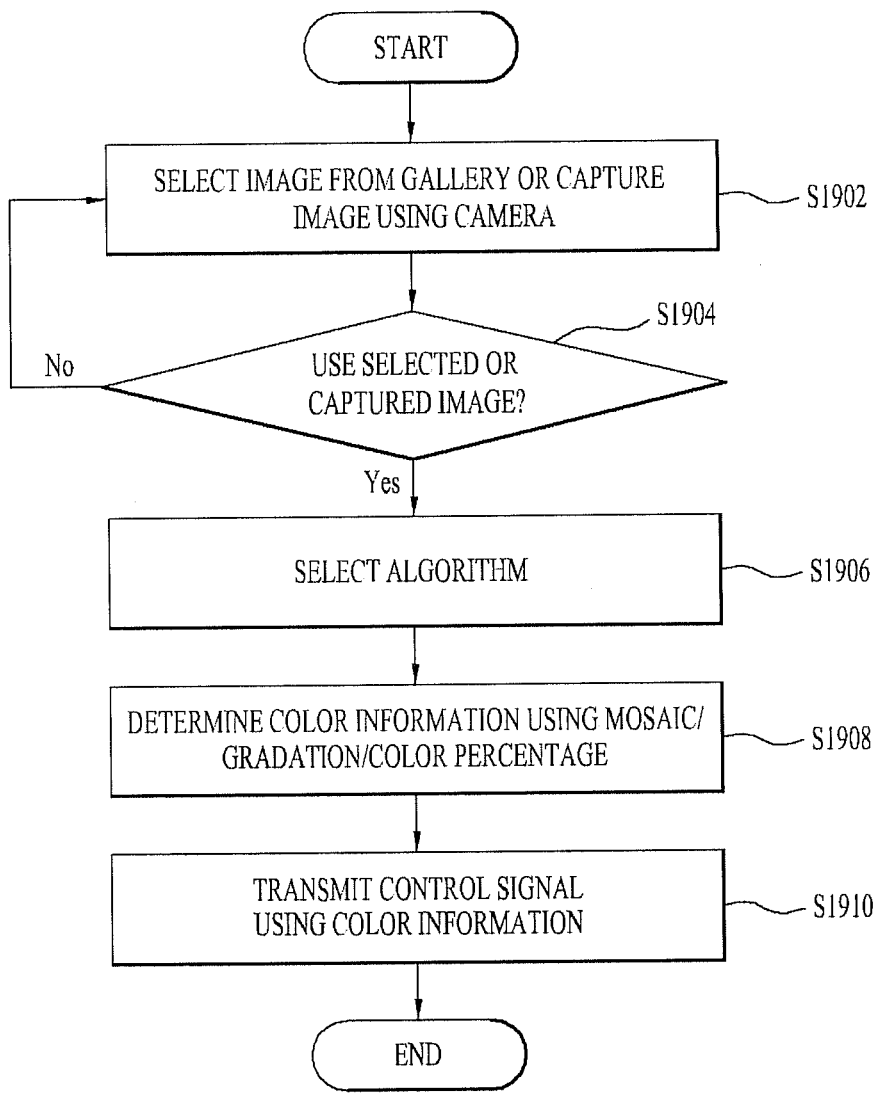

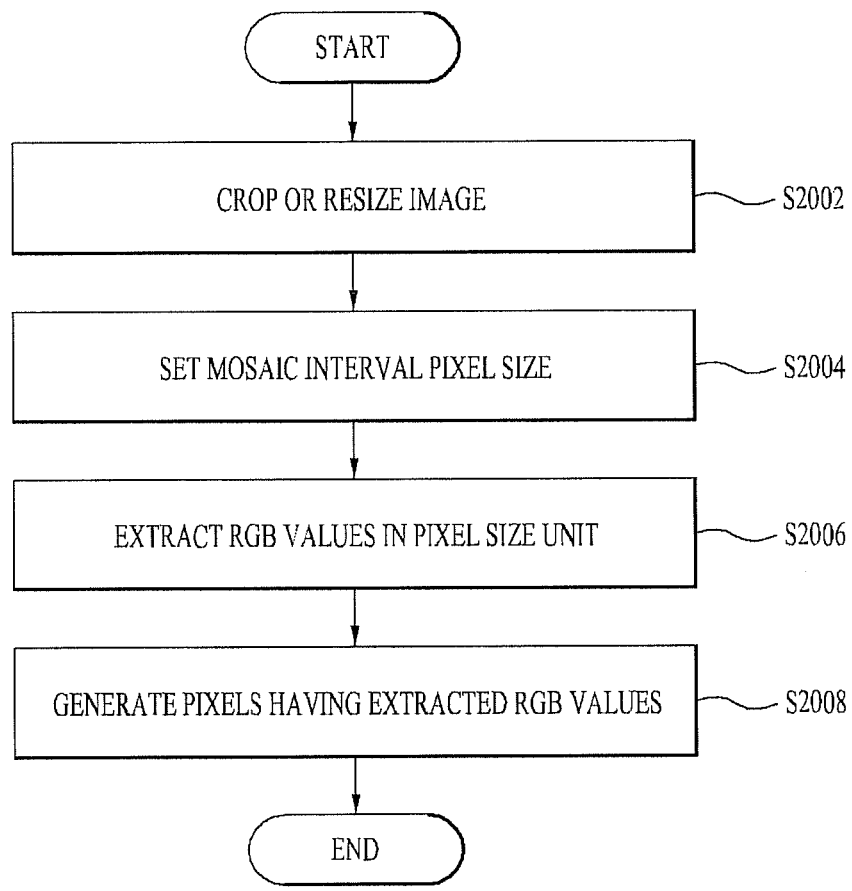

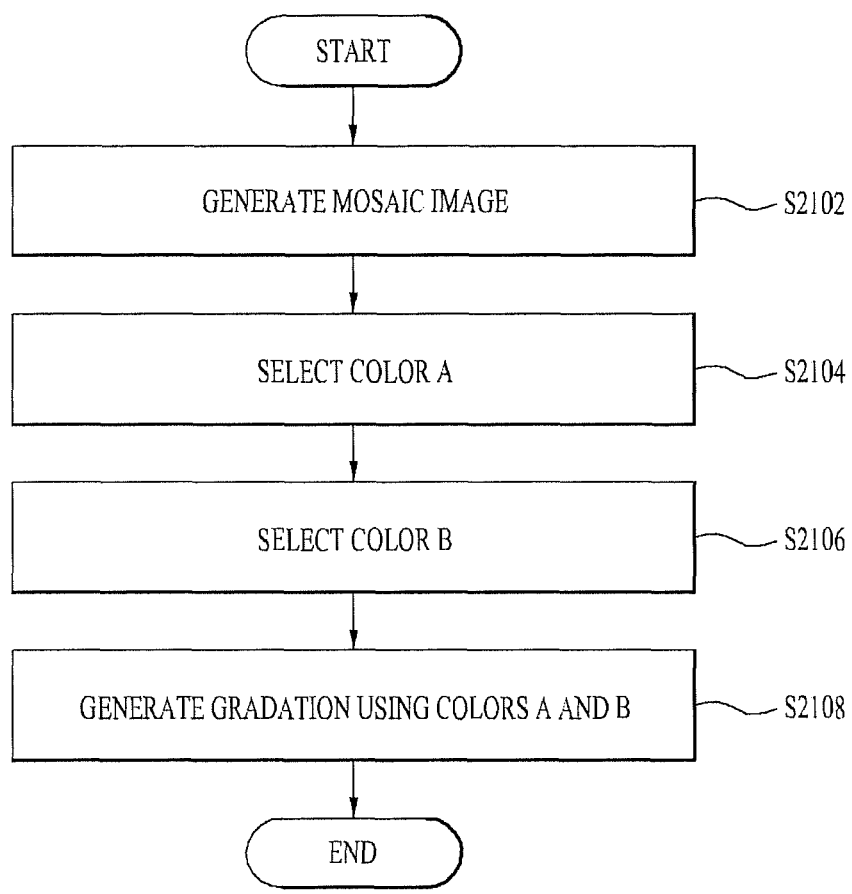

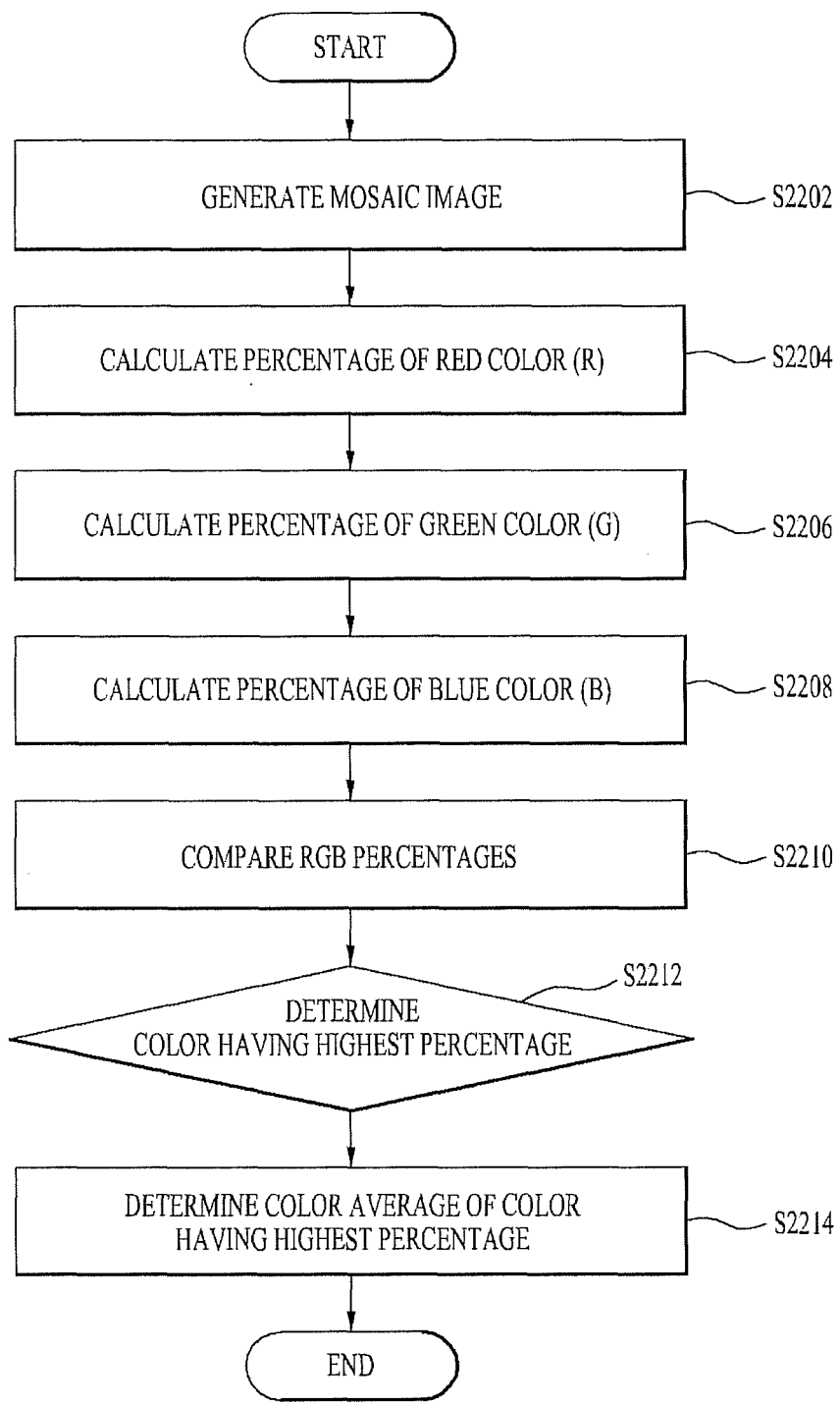

LIGHTING SYSTEM, LIGHTING APPARATUS, AND LIGHTING CONTROL METHOD

CROSS-REFERENCE TO RELATED APPLICATION(S)

This application claims priority under 35 U.S.C. §119 to Korean Applications No. 10-2012-0038068 filed on Apr. 12, 2012, and No. 10-2012-0038069 filed on Apr. 12, 2012, and U.S. provisional application No. 61/746,573 filed on Dec. 28, 2012, whose entire disclosure(s) are hereby incorporated by reference.

BACKGROUND

1. Field

A lighting system, a lighting apparatus, and a method of controlling the same are disclosed herein.

2. Background

Lighting systems, lighting apparatuses, and methods of controlling the same are known. However, they suffer from various disadvantages.

BRIEF DESCRIPTION OF THE DRAWINGS

The embodiments will be described in detail with reference to the following drawings in which like reference numerals refer to like elements wherein:

FIG. 1 is a conceptual view showing an embodiment of a lighting system;

FIG. 2A is a view showing an embodiment of a relationship among components in the lighting system of FIG. 1;

FIG. 2B is a view showing an embodiment of a detailed construction block diagram of a controller of the lighting system;

FIGS. 3A to 3D are views showing embodiments having different configurations of a light emitting unit in the lighting system and a lighting control device;

FIG. 5 is a view showing an embodiment of a construction block diagram of the lighting control device;

FIG. 7 is a view showing embodiments of motion of a user related to lighting control;

FIGS. 14 to 16 are flowcharts showing a lighting control process according to touch in the lighting control device;

FIG. 17 is a view showing embodiments of an image processing method, such as color sense data generation, for color sense reproduction in a lighting apparatus;

FIG. 18 is a view showing an embodiment in which color sense is reproduced according to a lighting control method; and FIGS. 19 to 22 are flowcharts showing embodiments of an image processing method for color sense reproduction.

DETAILED DESCRIPTION

Figure 3A:
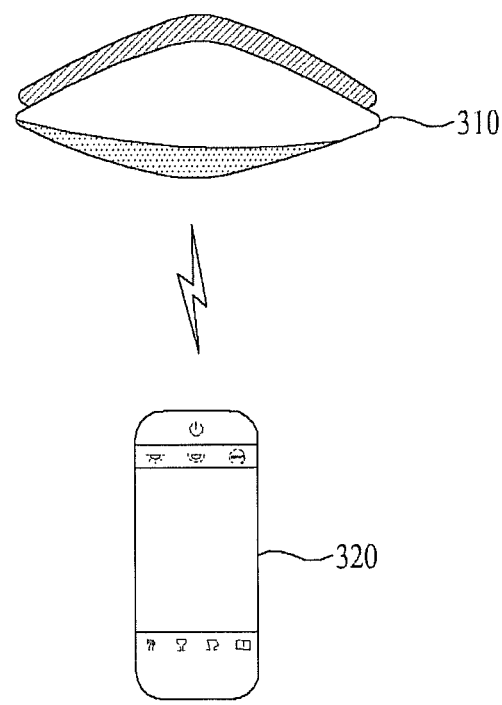

The present disclosure relates to a lighting system, a lighting apparatus, and a lighting control method, and more particularly, to a lighting control method of controlling a lighting apparatus based on a motion or touch of an input device and/or providing a lighting effect similar to a focused or input image based on data of the image, a lighting system, and a lighting apparatus.

A conventional lighting system, which uses light sources, such as an incandescent lamp, a discharge lamp, and a fluorescent lamp, has been used for house, decoration, and industry. Of the above light sources, the incandescent lamp, which is a resistive light source, has low efficiency and generates a large amount of heat, the discharge lamp is very expensive and requires a high voltage, and the fluorescent lamp causes environmental pollution due to its use of mercury.

A lighting emitting diode (LED) may provide advantages in efficiency, various color reproduction, and unlimited design. The lighting emitting diode is a semiconductor device that emits light when forward voltage is applied. The lighting emitting diode has electrical, optical, and physical properties in which lighting emitting diode has a long lifespan and low power consumption, and is suitable for mass production. By virtue of these properties, the above conventional light sources have been rapidly replaced by the lighting emitting diode.

In a large-sized building or a house, however, the light apparatus is controlled only through a program switch or a dedicated control means for the light apparatus, which may be inconvenient to use. Also, the light apparatus has limits in expressing or reproducing colors or setting lighting schemes, such as reproducing a color of the sky, sunset, sunrise, or simply being capable of reproducing a color scheme desired by the user.

Accordingly, the present disclosure is directed to a lighting system, a lighting apparatus, a lighting control device and a method of controlling the same that substantially obviate one or more problems due to limitations and disadvantages of the related art.

An object of the present disclosure is to control a lighting apparatus connected via a wired/wireless network using an available peripheral input device in addition to a predetermined control means.

Another object of the present disclosure is to easily and conveniently control the lighting apparatus through a motion or touch of the input device without performing several complex processes.

Another object of the present disclosure is to provide a feedback according to a control command during controlling of the lighting apparatus through the input device, thereby improving user's convenience in lighting control.

Another object of the present disclosure is to control the lighting apparatus based on an image focused or input through the input device such that the lighting apparatus has lighting effects identical or similar to the image.

Another object of the present disclosure is to control dimming, color temperature, and color sense (e.g., color) of the lighting apparatus according to request or intention of a user through the input device, thereby improving user's satisfaction and marketability.

A further object of the present disclosure is to provide a lighting system including the input device and the lighting apparatus.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

Reference will now be made in detail to various embodiments of a lighting system, a lighting apparatus, and a lighting control method, examples of which are illustrated in the accompanying drawings. It should be noted herein that these embodiments are for illustrative purposes only and the technical idea of the disclosure is not limited thereto.

Meanwhile, the size and shape of elements shown in the drawings may be enlarged or reduced for the convenience of description.

Also, terms including ordinal numbers, such as first and second, are used in this specification. However, elements corresponding to the terms are not limited by the ordinal numbers, or the elements are not limited by the sequence based on the ordinal numbers. The ordinal numbers are used only to distinguish between the elements.

In this specification, a "lighting control device" is intended to include all control means connected to a lighting system (or a lighting apparatus) via a wired/wireless network to control the lighting system (or the lighting apparatus). For example, the lighting control device may include a standing device, such as a digital television and a personal computer (PC), and a mobile device, such as a smart phone, a tablet PC, and a laptop computer. In addition, the lighting control device may also include a dedicated control means, such as a commissioning tool, for the lighting system or the lighting apparatus. Hereinafter, a mobile device will be described as an example of the lighting control device simply for the sake of convenience.

In this specification, meanwhile, the lighting apparatus may be a lighting system or a lighting unit, such as a lighting emitting device (LED), according to circumstances. Meanwhile, the wired/wireless network is a network for connection between digital devices using various communication specifications. The wired/wireless network may be formed according to communication specifications for wired connection, such as Universal Serial Bus (USB), Composite Video Banking Sync (CVBS), Component, S-Video (Analog), Digital Visual Interface (DVI), High Definition Multimedia Interface (HDMI), RGB, and D-SUB, or communication specifications for wired connection, such as Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet Access (HSDPA), Long Term Evolution (LTE), and Wi-Fi Direct.

Also, a 'motion' as used in this specification includes change of a state, such as action, with respect to the lighting control device. Such a state change may include all inputs to control the lighting apparatus based on user's intention according to movement through the comparison between the current state and the previous state. User's action includes all inputs to request the lighting apparatus to perform a specific function or operation, for example, due to a tilt (or angle), direction, and position different from those of the previous state. The state change may be performed by users' physical pressure or force. Meanwhile, the motion may include various operations, such as shaking, up/down, and roll left/roll right. The motion may be referred to as a gesture.

The lighting control device may directly or indirectly include all means necessary to recognize the above motion and to control the lighting apparatus based on the recognize motion. The means may include a tilt sensor, an acceleration sensor, a gyro sensor, a pressure sensor, a distance sensor, a temperature sensor, and a touch sensor.

Also, a 'touch' as used in this specification may be processed in a manner similar to in the above motion.

In addition, a 'color sense' as used in this specification may include various parameters regarding lighting effects provided by the lighting apparatus. The color sense may include more than merely color of the light source, and may be combined, for example, with various parameters used when the lighting apparatus provides lighting effects, such as dimming and color temperature.

Meanwhile, a mobile device is described as an example of the lighting control device in this specification. Consequently, it is necessary to basically perform pairing between the lighting apparatus and the lighting control device via a wired/wireless network. To this end, the lighting control device may be directly paired with lighting apparatus using a communication protocol supported in the network. Alternatively, the lighting control device may be indirectly paired with the lighting apparatus using at least one other digital device. Meanwhile, the lighting control device may be provided with firmware or software, such as an application, or such firmware or software may be downloaded to the lighting control device such that the firmware or software can be used when the lighting control device controls the lighting apparatus.

Hereinafter, simply for ease of discussion, the lighting apparatus will be described as being controlled through a lighting control application provided by the lighting control device. In this case, it is possible for the lighting control device to provide information regarding color senses in various modes to the lighting apparatus or to request the lighting apparatus to realize such color senses. Meanwhile, a user may provide an image acquired using a digital camera or a PC, a focused image, or color sense data to the lighting apparatus through the lighting control device such that the image or the color sense data can be realized by the lighting apparatus. The lighting apparatus may store the input image or the color sense data (lighting scheme) for future use. Generation or processing of the color sense data may be performed by the lighting control device and/or the lighting apparatus.

In a case in which the user requests the lighting apparatus to reproduce or realize various colors through the lighting control device as described above, control based on the motion or touch input of the lighting control device as described above is also possible. For example, in a case in which the user requests the lighting apparatus to reproduce a color corresponding to a specific image through the lighting control device but is not satisfied with the result, it is possible to further control chromaticity and concentration of the color through an input at the lighting control device, for example, through a touch input, motion inputs at the lighting control device or another appropriate type of input.

Also, the lighting apparatus may be a flat type lighting apparatus, a bulb type lighting apparatus, a PAR type lighting apparatus, or a combination type lighting apparatus in which the flat type lighting apparatus, the bulb type lighting apparatus, and/or the PAR type lighting apparatus are combined.

FIG. 1 is a conceptual view showing an embodiment of a lighting system, and FIGS. 2A and 2B are views showing embodiments of a relationship among components in the lighting system of FIG. 1.

The lighting system includes a lighting control device to control power on/off, color temperature, dimming, and color sense of at least one light emitting diode, e.g., a lighting control device. The lighting control device includes a mobile device paired with the lighting system using a wired/wireless communication protocol to control the light emitting diode as previously described. The wired/wireless communication protocol may include or use Wi-Fi or Wi-Fi direct, transfer control protocol/Internet protocol (TCP/IP), RS-232, RS-485, ZigBee, long term evolution (LTE), WiMax, local area network (LAN), and universal serial bus (USB). Hereinafter, simply for convenience, ZigBee will be described as an example of the communication protocol.

The lighting system may be divided into a management unit, a control unit, and a device unit. The management unit may include a monitoring board 80. The management unit may further include a web server (not shown). The monitoring board 80 may be management software or hardware operated by the management software. The web server may be paired with a lighting control device, such as a personal computer (PC) of a user, via the Internet to transmit and receive various data, such as a control command, to and from the lighting control device.

The management unit may be connected to a controller 20 in the control unit in a TCP/IP or simple object access protocol/extensible markup language (SOAP/XML) mode to set, control, and monitor the lighting system and to perform data exchange.

The control unit may include the controller 20 and a gateway 30. The control unit may further include an interface unit 10. The controller 20 may be connected to the interface unit 10 and the gateway 30 in a TCP/IP mode. The controller 20 may control the device unit through the gateway 30. The interface unit 10 may include a control touch panel to receive a user input.

The device unit may include a device realized in the form of a hybrid solution or a device realized in the form of a legacy solution (not shown). For example, the hybrid solution is a solution in which various devices are combined to constitute a set.

One example of the hybrid solution may include a combination of bridge devices (BD) 40 and 50 connected to the gateway 30, a plurality of light emitting units 41 to 43 and 51 to 53 connected to the bridge devices (BD) 40 and 50, a program switch 60, and one or more sensors 70, which may constitute a set. The hybrid solution may include a configuration in which a plurality of bridge devices (BD) 40 and 50 are connected to a plurality of gateways 30 or a single gateway 30.

Although not shown, the legacy solution may be connected to the controller 30 in a third party protocol mode. The legacy solution may include a combination of a network control unit (NCU), a light interface unit (LIU), a central processing unit (CPU), a transmission unit (TU), a relay, and a program switch.

The lighting system of FIG. 1 or 2 may be a system realized in a large-sized building, such as a building B, or in a small or middle-sized building, such as a house H.

The lighting system may include one or more bridge devices (BD) 40 and 50. Each bridge device (BD) may be connected to a plurality of light emitting units 41 to 43 and 51 to 53.

Each bridge device (BD) may be connected to a switch 60 to control power on/off, dimming, color temperature, and color sense of the light emitting units 41 to 43 and 51 to 53 and a sensor 70 to sense luminous intensity in a predetermined space. Each bridge device (BD) may transmit and receive data. The bridge device (BD) may be housed separately or combined with at least one of the light emitting units 41 to 43 and 51 to 53, the switch 60, or sensor 70. Moreover, the bridge device (BD) may be hard wired to these devices or configured to communicate wirelessly with the various devices in the system.

The monitoring board 80 and the controller 20 may manage status information regarding power on/off, luminous intensity, color temperature, and color sense of the light emitting units at each floor or a specific area in a building or a house H or power consumption in real time to find a place at which energy is unnecessarily consumed, thereby minimizing power consumption. Also, the monitoring board 80 and the controller 20 may perform building facility maintenance, facility operation repair and maintenance, and building interior environment maintenance, and may manage used energy and materials.

Referring to FIG. 2A, lighting L may be a plurality of light emitting units 41 to 43 and 51 to 53. Each of the light emitting units 41 to 43 and 51 to 53 may include a light emitting diode (LED). As previously described, each light emitting unit may be a flat type light emitting unit, a bulb type light emitting unit, a PAR type light emitting unit, or a combination type light emitting unit in which the flat type light emitting unit and the bulb type light emitting unit are combined. Each of the light emitting units 41 to 43 and 51 to 53 may include a means to supply power to the light emitting diode and to control connection status between the light emitting diodes. Also, each of the light emitting units may include a communication module, such as a ZigBee or RS-485 module. The communication module may be configured for wireless or wired communication.

The monitoring board 80 may receive a user input or set information regarding the lighting L connected to the controller 20, store the received user input or set information, and transmit the received user input or set information to the controller 20.

The monitoring board 80 may use HyperText Transfer Protocol (HTTP), Hypertext Transfer Protocol over Secure Socket Layer (HTTPS), and Simple Mail Transfer Protocol (SMTP). Also, the monitoring board 80 may communicate with the controller 20 through SOAP, which is a protocol to exchange XML-based message date on a network, or a House Automation and Control network (HACnet).

The monitoring board 80 may read stored lighting set information, transmit schedule control data to the controller 20 based on the read lighting set information, and transmit and monitor group-based or individual control data for light emitting diodes. The monitoring board 80 may receive information collected by the sensor 70 and use the received information to control a lighting apparatus.

The interface unit 10 may include a display panel to allow an input of a control command for the lighting L or to display status information of the lighting L. The interface unit 10 may transmit a control command to perform group-based or individual control for lighting requested by a user to the controller 20 through a graphical user interface (GUI), receive an execution result (response) from the controller 20, and display the received execution result. The group may be defined as including at least one light emitting diode. The light emitting diodes may be grouped for each floor of a building or house or for each predetermined area in each floor.

The controller 20 may perform communication with an external device, control lighting, and monitor lighting status. The external device may include at least one selected from among, for example, the monitoring board 80, the interface unit 10, the gateway 30, and the lighting control device.

The gateway 30 may receive the control command to perform the group-based or individual control for lighting from the controller 20, execute the received control command, and return the execution result to the controller 20. One example of the gateway 30 may be a ZigBee gateway.

The bridge devices (BD) 40 and 50 may be connected to the gateway 40 and the light emitting units 41 to 43 and 51 to 53 to transmit the control command from the gateway 30 to the light emitting units and return response or event information of each of the light emitting units to the gateway 30.

Each of the bridge devices (BD) 40 and 50 may be connected to a prescribed number of light emitting units. For example, in certain configurations, a maximum of 12 light emitting units may be supported, while in other configurations a great number of light emitting units may be supported. The bridge devices (BD) 40 and 50 and the gateway 30 may be connected to each other through ZigBee, and the bridge devices (BD) 40 and 50 and the light emitting units may be connected to each other through RS-485. That is, connection may be achieved in different modes. However, connection may also be achieved in the same mode, such as ZigBee, RS-485, or another communication mode. Moreover, each light emitting unit 41 to 43 and 51 to 53 may be configured for wireless communication. For example, each light emitting unit 41, 42, 43 may be configured to communicate with the bridge device (BD) 40 as well as each other wirelessly. In one embodiment, a bridge device (BD) 40 may be installed in the enclosure of each light emitting unit 41, 42, 43 to allow each light emitting unit to individually communicate with the gateway 30.

At least one selected from among the monitoring board 80, the interface unit 10, the controller 20, the gateway 30, and the bridge devices (BD) 40 and 50 may generate address data and control data for the light emitting units, and transmit the generated address data and control data to the light emitting units in a packet form, or retransmit the received control data to the light emitting units. If necessary, each component may convert address data and control data into a format necessary to transmit or retransmit the address data and control data to the light emitting units.

A control command between the interface unit 10 and each of the light emitting units 41 to 43 and 51 to 53 may be transmitted and received through the following procedure.

A control command input through the interface unit 10 may be sequentially transmitted to the controller 20, the gateway 30, and the bridge device (BD) 40. The control command may be transmitted from the bridge device 40 to a corresponding light emitting unit 41. Also, a response or event information related to the light emitting units 41 to 43 and 51 to 53 may be transmitted in reverse order.

The components of the lighting system of FIGS. 1 and 2 as described above are only an embodiment, and all of the components are not requisite. If necessary, therefore, some of the components may be omitted, or new components may be added. Some of the components may be combined into a module or vice versa. For example, a hub may be provided that includes one or more of the components. The controller 20 and gateway 30 may be integrated into one housing and may be referred to as a hub. It should be appreciated, however, that a hub as referred to herein may include a single component such as the gateway, for example. Moreover, each light emitting unit 41 to 43 and 51 to 53 may include a bridge device (BD) 40, 50 for wireless ZigBee communication with the controller 20 and gateway 30. Each light emitting unit 41 to 43 and 51 to 53 may also include one or more of the program switch 60 and/or sensor 70. As previously described, the monitoring board 80 and interface unit 10 may communicate with the controller 20 and gateway 30 over various communication protocols, such as TCP/IP. It should be apparent that any suitable network device may also be provided which facilitates communication over the appropriate protocol, such as a wireless router, signal repeater, or the like. For example, the wireless router may enable wireless communication between the monitoring board 80 and/or interface unit 10 with the integrated housing that includes the controller 20 and gateway 30.

FIG. 2B is a view showing an embodiment of a detailed construction block diagram of the controller 20 of the lighting system.

The controller 20 may include a microcomputer (MiCom) 21, a connection management module 22, a communication module 23, an SOAP connection manager 24, and a HACnet connection manager 25.

The microcomputer 21 is a module to process lighting control data. The microcomputer 21 may control lighting control to be appropriately performed through the communication module 23 based on a lighting control request received from the interface unit 10 or the monitoring board 80 through the SOAP connection manager 24 and the HACnet connection manager 25. The microcomputer 21 may return response or event information based on the requested lighting control to the interface unit 10 or the monitoring board 80 through the connection management module 22.

The microcomputer 21 may perform group-based or individual control of the light emitting units 41 to 43 and 51 to 53 or the lighting L, the switch 60, or the sensor 70, and control related to pattern, schedule, blackout/recovery, and luminous intensity.

The communication module 23 may perform communication between the controller 20 and the gateway 30. The communication module 23 may reconfigure (convert) a control request from the microcomputer 21 into a packet that can be recognized by the light emitting units 41 to 43 and 51 to 53 or the lighting L, the switch 60, or the sensor 70 and transmit the control request reconfigured into the packet to the gateway 30. The communication module 23 and the gateway 30 may transmit and receive information through, for example, TCP/IP or another appropriate communication protocol. The communication module 23 may receive response and event information of the light emitting units 41 to 43 and 51 to 53 or the lighting L, the switch 60, or the sensor 70 from the gateway 30 and transmit the received response and event information to the microcomputer 21.

Upon receiving a control request form the interface unit 10, the connection management module 22, the SOAP connection manager 24, and the HACnet connection manager 25 convert the control request into an internal language that can be recognized by the controller 20 and transmit the control request converted into the internal language to the microcomputer 21. In other words, the connection management module 22, the SOAP connection manager 24, and the HACnet connection manager 25 may interpret and/or convert a protocol corresponding to the monitoring board 80 or the interface unit 10 connected thereto.

Hereinafter, a method of controlling a lighting apparatus using a lighting control device will be described in detail.

FIGS. 3A to 3D are views showing embodiments having various configurations for a light emitting unit in the lighting system and a lighting control device.

Figure 3B:
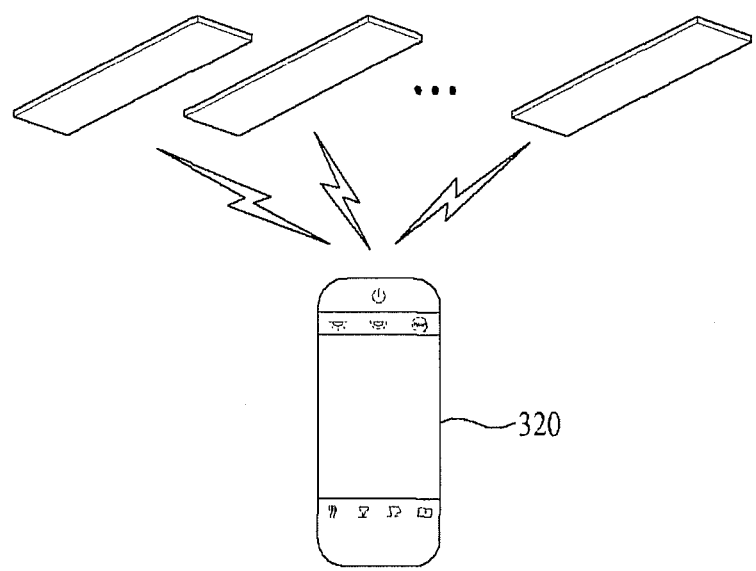
Figure 3D:
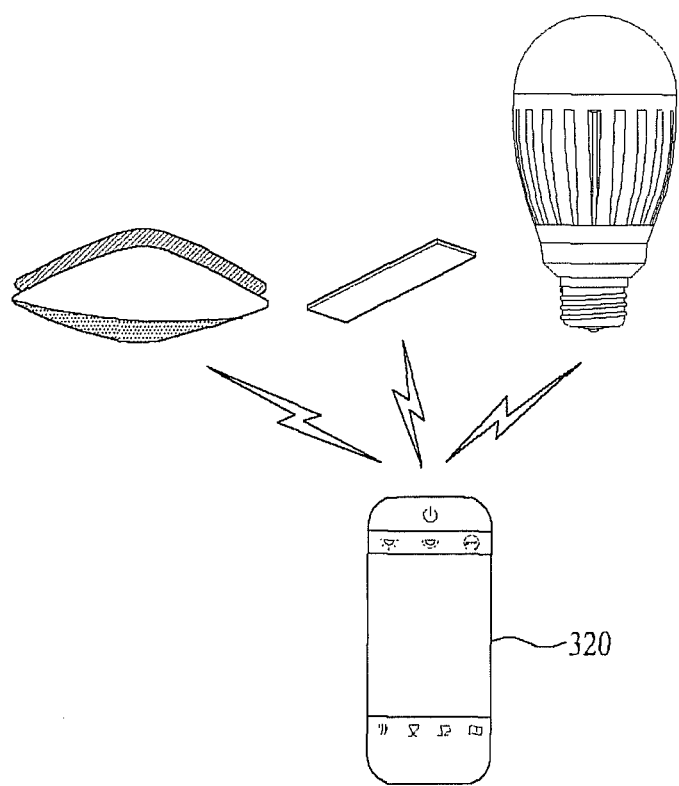

A light emitting unit 310 may include a flat type light emitting unit as shown in FIGS. 3A and 3B, a bulb type light emitting unit as shown in FIG. 3C, and a combination type light emitting unit, in which the flat type light emitting unit and the bulb type light emitting unit are combined, as shown in FIG. 3D.

A lighting control device 320 may be, for example, a mobile device as shown in FIG. 3. The lighting control device 320 and the light emitting unit 310 may be directly connected to each other without other components present therebetween so as to perform a direct control process. In one embodiment, an external module may be provided to enable ZigBee communication to the mobile device 320. Here, the external module may include the previously described controller 20 and gateway 30. The external module may be connected to the mobile device 320 via a headphone jack or data port of the mobile device 320, for example. Also, although not shown, the above lighting system or another digital device may be connected between the lighting control device 320 and the light emitting unit 310 so as to perform an indirect control process.

Meanwhile, the lighting control device 320 may simultaneously control a plurality of light emitting units or various combinations of light emitting units as illustrated in FIG. 3D.

Figure 4:
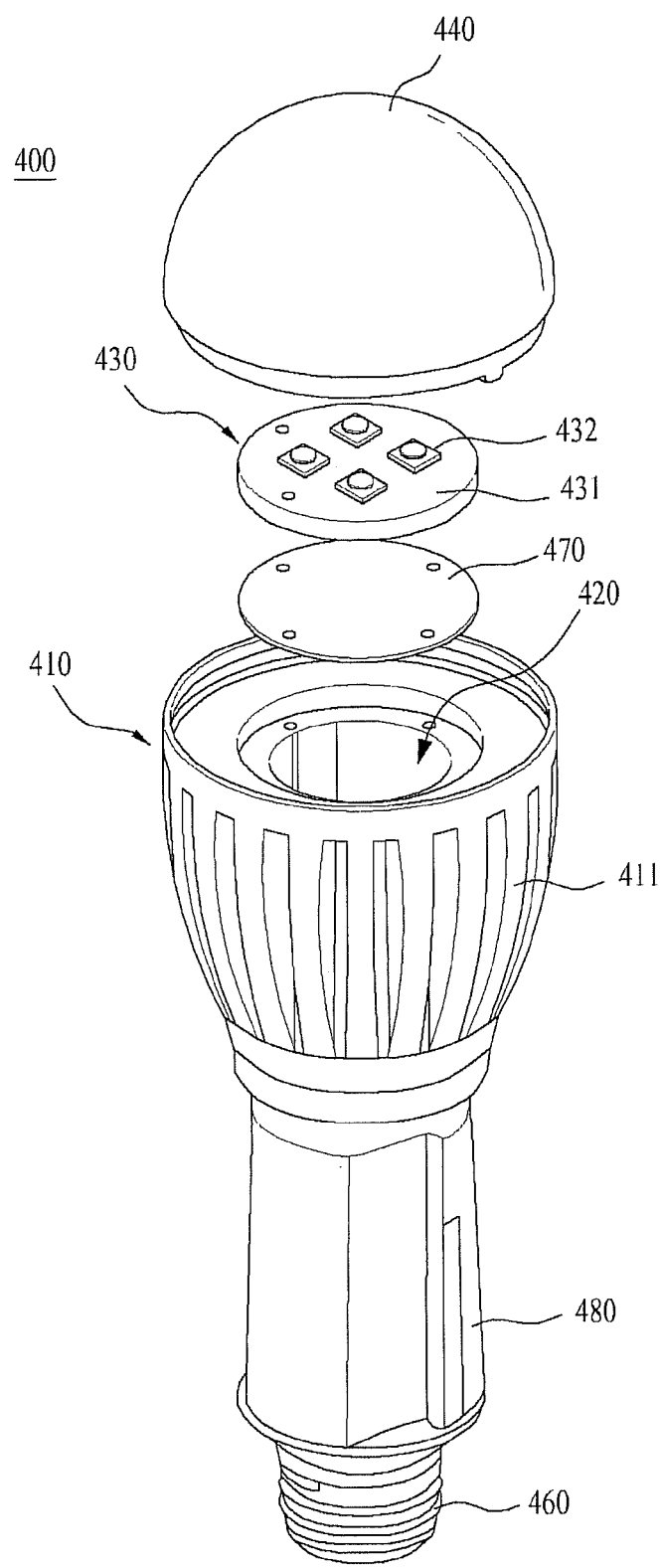
FIG. 4 is a exploded perspective view of a light emitting device according to one embodiment.

FIG. 4 is a exploded perspective view of a light emitting device according to one embodiment. The light emitting device 400 may include a body 410, a cavity 420 formed in the body 410, an LED module 430, a bulb or lens 440, a heat conduction plate 470, electrical module housing 480 and an electrical socket 460.

The LED module 430 may have a plurality of LED 432 provided on a top surface of the substrate 431. The body 410 may be a heat sink to transfer heat generated by the LEDs 432. The body 410 may be formed of a material suitable for heat conduction. Moreover, the LEDs 432 may include LEDs that produce red light, green light and blue light (RGB). The characteristics of the light emitted from the LEDs 432 may be controlled by a controller. The controller may be provided in an electrical module placed inside the electrical module housing 480.

The electrical module may include a wireless communication module configured to receive control signals from an external hub, bridge device, mobile terminal, or the like. The wireless communication module may be configured to communicate according to the ZigBee communication protocol. The electrical module may also include a communication module enabled to communicate among a plurality of light emitting devices 400 and a bridge device (BD) over an RS-485 connection, as previously described with respect to FIG. 1.

When a control signal is received through the wireless communication module, the controller may control the brightness, color, and color temperature of the light emitted from the light emitting device 400. The control signal may individually control the light characteristics of each of the LEDs separately or at the same time. Moreover, the control signal may also turn the power on or off.

FIG. 5 is a view showing an embodiment of a construction block diagram of the lighting control device.

The lighting apparatus may include a lighting unit including a first control unit to extract color sense pattern data of an image into a predetermined unit and to generate lighting control color sense data, a device including a transmission unit to transmit the lighting control color sense data in the predetermined unit, a plurality of light sources to control color sense, a plurality of light emitting diodes, a receiving unit to receive lighting control color sense data from the device, and a second control unit to decide the light source of the light emitting diode corresponding to the predetermined unit of the received data and to control the corresponding light emitting diode using the decided light source based on the lighting control color sense data.

Meanwhile, the first control unit may reconfigure the image into a predetermined unit so as to correspond to the lighting apparatus or the light emitting diodes of the lighting apparatus, generate the color sense data using at least one of a mosaic pattern mode, a gradation pattern mode, a color percentage pattern mode, or the like, assign a mosaic interval pixel size to the reconfigured image, extract RGB values into the assigned pixel size unit, and generate pixels having the extracted RGB values.

The first control unit may generate a mosaic image, select at least one color within a color range, generate gradation based on the selected at least one color, generate a mosaic image based thereupon, calculate percentages of a red color (R), a green color (G), and a blue color (B), distinguish a color having the highest percentage from the colors having the calculated percentages, and deduce a color average of the color having the highest percentage.

The predetermined unit may be a dot unit, and the color sense pattern data and/or the lighting control color sense data may include color temperature and/or luminous intensity. The image may be received from a mobile device and/or a portable computing device. In addition, the lighting unit may include flat type lighting.

The lighting system may include a lighting apparatus including a wireless transmission and receiving unit and a mobile device, including a wireless transmission and receiving unit and a motion recognition sensor, to control the lighting apparatus according to a motion of a device. The mobile device may provide a feedback corresponding to the status of the lighting apparatus according to the control. The feedback may include at least one of vibration, sound, UI, screen blinking, or the like, or a combination thereof. The mobile device may distinguish the type of at least one motion of the device selected from among shaking, up and down, right and left, diagonal line, or clockwise/counterclockwise circle, and control at least one of power on/off, color temperature, dimming of the lighting apparatus based on the distinguished type of the motion or another appropriate type of function.

The mobile device may set a critical value to control the lighting apparatus based on the device motion and, when data regarding the device motion are input, generate control data of a corresponding function level through comparison between the input data and the critical value. If continuous motion data are not input within a predetermined first time, the mobile device may perform at least one of (a) ignoring previously input motion data and waiting for new motion data input, (b) generating control data based on the previously input motion data, or (c) returning to an initial screen if new motion data are not input before a predetermined second time.

The mobile device may receive status information regarding current status from the lighting apparatus to decide the attribute or level of the feedback.

The motion recognition sensor may include at least one of an acceleration sensor, a gyro sensor, a pressure sensor, a distance sensor, a tilt or angle sensor, a direction sensor, or another appropriate type of sensor. The mobile device may select at least one lighting apparatus and/or functions of the selected lighting apparatuses according to user key input, simultaneously control the lighting apparatuses and the functions according to the device motion, and generate motion data of the device only when a lighting control application is executed to control the lighting apparatus.

In addition, the mobile device may be at least one of a dedicated remote controller for lighting control, a portable communication device, a portable computing device, or another appropriate type of device. For example, the lighting control device 510 may include a touch unit 520, a controller 530, a transformer 540, a filter 550, an antenna 560, and a power supply unit 580. However, the illustrated components are provided for lighting control. Other components may be added, or some of the components may be omitted. Meanwhile, in this specification, an embodiment of the lighting control device 510 is a mobile device. Although not shown, the lighting control device 510 may further include other components based on characteristics of the mobile device.

The touch unit 520 may apply a gradation of m points×n points (where, n and m indicate positive integers) and generate point information regarding a portion touched by a user.

The touch unit 520 may refer to coordinate information based on rectangular coordinates, for example, to generate touch point information and generate each piece of touch point information even when a drag is performed after a first touch or continuous touches are performed. In a case in which the drag is performed, the touch unit 520 may generate only information regarding the first touched point and the touch point on a region at which the drag is finished as touch point information and transmit the generated touch point information. On the other hand, in a case in which a plurality of pieces of touch point information exists including a case in which the drag is performed, touch direction information may also be transmitted. The touch direction information may be information to distinguish between, for example, an up and down direction, a left and right direction, and a diagonal direction.

The touch unit 520 may be differently operated according to the number of the generated point information. For example, in a case in which only a piece of point information exists, the touch unit 520 is sufficient to transmit coordinate information regarding the corresponding touch point. On the other hand, in a case in which a plurality of pieces of point information exists, the touch unit 520 may transmit at least one of coordinate information, direction information, information regarding positional differences between the respective pouch points, or the like.

In particular, the touch unit 520 may generate and transmit one or more control data in addition to the point information based on the direction information. For example, if the direction information indicates an up and down direction, the touch unit 520 may transmit dimming control information. If the direction information indicates a left and right direction, the touch unit 520 may transmit color temperature control information. If the direction information indicates a diagonal direction, the touch unit 520 may calculate point differences in the up and down direction and the left and right direction based on the rectangular coordinates and transmit information that is capable of simultaneously controlling dimming and color temperature.

The touch unit 520 may refer to coordinate information based on rectangular coordinates, for example, to generate touch point information, generate each piece of touch point information even when a drag is performed after a first touch or continuous touches are performed, and transmit the generated touch point information to the controller 530.

In a case in which the drag is performed, the touch unit 520 may generate, for example, only information regarding the first touched point and the touch point on a region at which the drag is finished as touch point information and transmit the generated touch point information.

On the other hand, in a case in which a plurality of pieces of touch point information exist including a case in which the drag is performed, direction information based on the rectangular coordinates may be transmitted. The direction information may be information to distinguish between an up and down direction, a left and right direction, and a diagonal direction.

In addition, in a case in which only a piece of generated point information exists, the touch unit 520 may only transmit coordinate information. On the other hand, in a case in which a plurality of pieces of point information is generated, the touch unit 520 may transmit information regarding differences between the respective touch points together with coordinate information. Also, in a case in which the direction information is a diagonal direction, the touch unit 520 may individually transmit point differences in the up and down direction and the left and right direction based on the rectangular coordinates. Meanwhile, the touch unit 520 may extract pixel or dot information corresponding to user selection of pixels or dots and transmit the extracted pixel or dot information to the controller 530. In this case, the touch unit 520 may extract color sense data from the pixel or dot selected according to the request of the controller 520 or as default and transmit the extracted color sense data to the controller 530.

The controller 530 may be a 2.4 GHz ZigBee wireless communication transceiver system on chip (SoC) having IEEE 802.15.4 MAC/PHY embedded therein. The controller 530 may have a processor, a flash/memory (FLASH/SRAM), and a coding means therein. In addition, the controller 530 may use an SPI (Ethernet, EEPROM), TWI (RTC module), or JTAG (SIF) interface.

In a case in which a high impedance balance antenna is matched with a low impedance unbalance receiver, transmitter, or transceiver, a balance to unbalance (Balun) transformer having high a conversion rate may be used as the transformer 540. For example, in a case in a case in which a signal is a differential signal of 100 ohm, the transformer 540 may convert the 100 ohm impedance into 50 ohm impedance according to a transmission/reception signal and may be driven in a filtering match state such that only a 2.4 GHz band passes through the antenna.

The filter 550 may be, for example, a low pass filter (LPF) to remove a harmonic component of an output and, at the same time, to filter a high frequency component of the output. When transmitting a radio frequency (RF) signal, the antenna 560 may couple the signal in the air and receive an input RF signal. Moreover, the power supply unit 580 may convert an input voltage of 5 VDC into a constant voltage of 3.3 VDC and supply the constant voltage to a ZigBee chip and other parts.

In addition to the above construction, the mobile device 510 may test the connection status between devices or a memory fusing function if necessary. In addition, the mobile device 510 may further include a Joint Test Action Group (JTAG) connector 570 to download a ZigBee software (S/W) program and to perform a debugging function.

Also, the mobile device 510 may further include a memory, a driver, a buffer, an input/output (I/P) port, and an interface (I/F) connector.

The memory may be an Electrically Erasable Programmable Read-Only Memory (EEPROM), which is a kind of non-volatile memory. The memory may have a capacity of, for example, 128 Kbytes. Also, the memory may be used as a temporary data ROM (DataROM) when ZigBee firmware is updated in a wireless fashion. Meanwhile, as will hereinafter be described, the memory may store a reference table of values predefined with respect to, for example, color temperature and a dimming level to be referred to when the controller 530 determines a control level according to the input at the touch unit 520.

The driver is used in long distance communication with an external device via a differential line in a half duplex mode in UART communication. The buffer may adjust the brightness of the external device (for example, a dimming connector) through width change of, for example, a 500 Hz pulse in a pulse width modulation (PWM) mode.

The I/O port may be connected to, for example, 12 light emitting units through RS 485 communication in a half duplex mode to individually control the light emitting units. The I/O port may receive a voltage of +5 VDC from the external device to drive an internal circuit. The I/F connector may receive a voltage of 5 VDC from the external device (for example, dimming connector) and output a 5 V PWM signal to perform dimming, such as down-lighting, through pulse width modulation (PWM) control.

When a high (H) value is input through a selection unit 590, the controller 530 may generate a control signal to select and control a room light. On the other hand, when a low (L) value is input through the selection unit 590, the controller 530 may generate a control signal to select and control a table light. In a similar manner, the controller 530 may determine an input of the selection unit 590 as an input to perform a control function, such as driving of a direct light and an indirect light, and activation of a smart function, and generate a control signal to the input.

Meanwhile, the controller 530 may receive a clock signal including an interrupt signal to determine user input and to generate a control signal according thereto.

Also, although not shown, the mobile device 510 may include a communication module for the aforementioned ZigBee communication. Also, each light emitting unit of the lighting device may include a communication module for ZigBee communication to receive a control signal according to the communication mode of the mobile device. The aforementioned communication module may be used for future firmware upgrade.

Meanwhile, as previously described, the lighting apparatus may have lighting effects based on an image, such as an image of a skyline, sunset or sunrise as desired by a user. To this end, the lighting apparatus may further include an image receiving unit to receive an image and an image processing unit to process the received image in addition to the construction shown in FIG. 5.

Figure 6A:
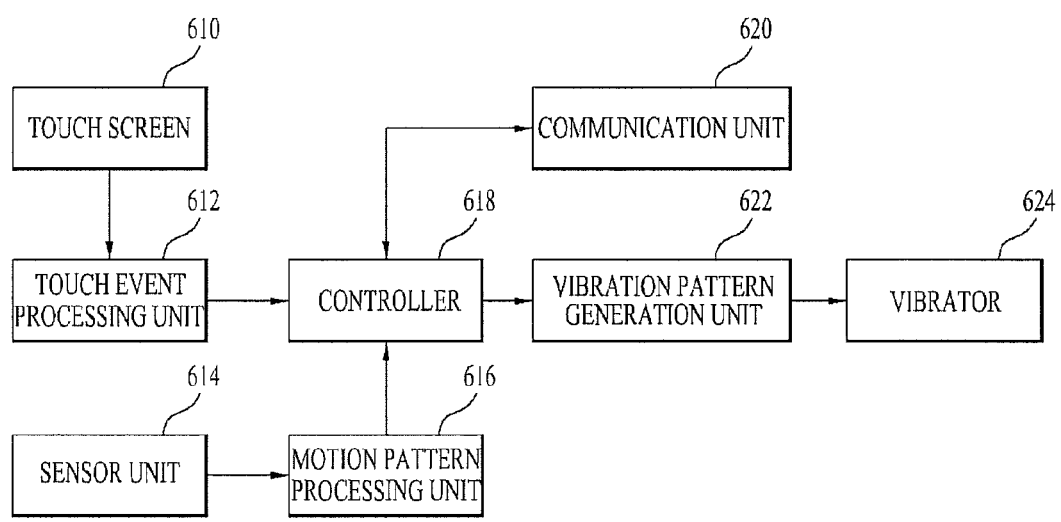
FIGS. 6A to 6B are views showing embodiments of a detailed construction block diagram of the lighting control device in connection with lighting control.
Figure 6B:
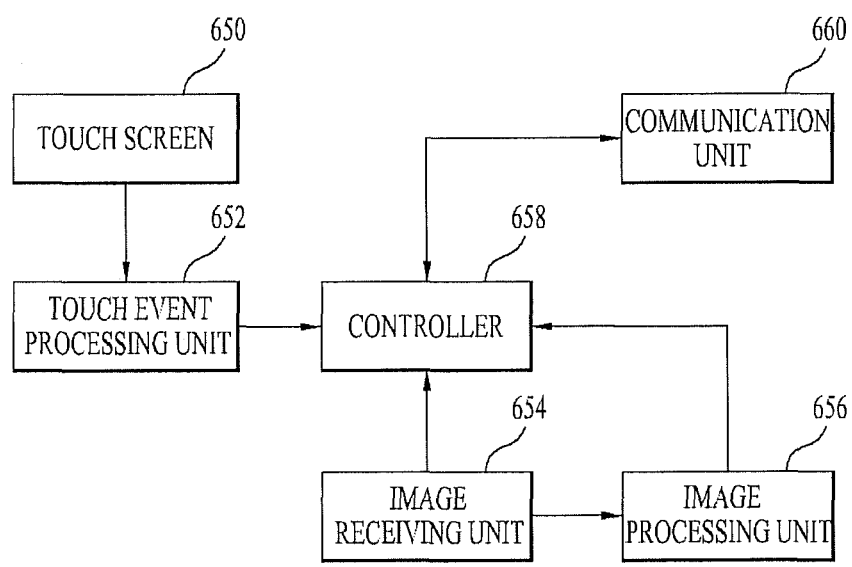

FIGS. 6A to 6B are views showing embodiments of a detailed construction block diagram of the lighting control device in connection with lighting control.

FIG. 6A shows the construction of the lighting control device in a case in which the lighting control device controls the lighting apparatus through an application. The components of FIG. 6A may overlap with those of FIG. 5. The components may be modified, removed, or necessary components may be added.

Referring to FIG. 6A, the mobile device may include a touch screen 610, a touch event processing unit 612, a sensor unit 614, a motion pattern processing unit 616, a controller 618, a communication unit 620, a vibration pattern generation unit 622, and a vibrator 624 for motion recognition of the mobile device and a mobile application to control the lighting apparatus.

The touch event processing unit 612 may determine the attribute and type of an event input through the touch screen 610 to distinguish a corresponding touch event and transmit data based thereupon to the controller 618. The touch screen 610 and the touch event processing unit 612 may correspond to the key input receiving unit 510 of FIG. 5.

The sensor unit 614 may sense data input according to a motion of a user, and the motion pattern processing unit 616 may distinguish a motion pattern corresponding to the user motion based on the sensed data. The distinguished motion pattern becomes data to control the lighting apparatus according to the user motion.

The controller 618 may generate data to control the lighting apparatus corresponding to the user input and motion based on the respective signals of the touch event processing unit 612 and the motion pattern processing unit 616 or a combination of the signals. The generated data may be transmitted to the lighting apparatus or the vibration pattern generation unit 622 through the communication unit 620.

The vibration pattern generation unit 622 may generate a corresponding vibration pattern based on the control data generated by the controller 618. As previously described, the controller 618 may generate control data to generate the vibration pattern based on data of the touch event processing unit 612 and the motion pattern processing unit 616 or based on a signal input from the lighting apparatus through the communication unit 620.

The vibrator 624 may produce vibration based on the vibration pattern data input from the vibration pattern generation unit 622 to provide a feedback according to the user motion. Meanwhile, in this specification, vibration is illustrated as an example of the feedback. However, embodiments of the present disclosure are not limited thereto. The feedback may be provided to the user in various forms, such as sound output from a speaker or a related feedback user interface (UI).

FIG. 6B shows an embodiment of the lighting control device to reproduce color sense data. The lighting control device may include a touch screen 650, a touch event processing unit 652, an image receiving unit 654, an image processing unit 656, a controller 658, and a communication unit 660.

The touch event processing unit 652 may determine the attribute and type of an event input through the touch screen 650 to distinguish a corresponding touch event and transmit data based thereupon to the controller 658. The image processing unit 656 may sense an image input through the image receiving unit 654 and extract color sense information from the sensed image data. The image processing unit 656 may generate color sense data to be applied to the lighting apparatus based on the extracted color sense information or directly transmit the extracted color sense information to the controller 658 such that lighting apparatus control color sense data are generated by the controller 658. Meanwhile, the image received by the image processing unit 656 may be an image received from a digital camera or an image directly captured or photographed by the mobile device.

The controller 658 may generate data to control color sense of the lighting apparatus corresponding to an image input based on the respective signals of the touch event processing unit 652 and the image processing unit 656 or a combination of the signals. The generated data are transmitted to the lighting apparatus through the communication unit 660.

The communication unit 660 may transmit a control signal of the controller 658 to the lighting apparatus according to a predetermined communication protocol or transmit a signal of the lighting apparatus to the controller 658. Also, the communication unit 660 may perform necessary format conversion based on the difference of communication protocol between the mobile device and the lighting apparatus.

In the above, a description was made on the basis of the mobile device. However, the lighting apparatus or the lighting system may have an image receiving and processing unit to process image data directly input from the lighting apparatus, automatically extract related color sense information, and express color sense.

Meanwhile, even in a case in which the mobile device is used to control the lighting apparatus connected to the mobile device via a wired/wireless network as previously described, it is possible to simply and easily control the lighting apparatus through the motion of the mobile device without performing several complicated processes. Also, when controlling the lighting apparatus through the mobile device, a feedback according to a control command may be provided for the user's convenience in lighting control.

FIG. 7 is a view showing embodiments for lighting control based on motion of the mobile terminal. The construction of FIGS. 1 to 6 as described above may be used to distinguish user motion.

User motion as illustrated in FIG. 7 may or may not be a motion related to lighting control. This is because a lighting control means as described in this specification may be dedicated for lighting control or a digital device having such a function. In the lighting control means as shown in FIG. 7, therefore, a process of determining whether user motion is a motion input for lighting control may be necessary. As an example of this process, user motion input in a state in which a lighting control application is executed may be determined as a motion input for lighting control.

FIGS. 7(*a*) to 7(*e*) show embodiments of various user motions input through, for example, the lighting control device. FIG. 7(*a*) shows an embodiment of user motion of shaking the lighting control device, FIGS. 7(*b*) and 7(*c*) show an embodiment of user motion of moving the lighting control device upward and downward, and FIGS. 7(*d*) and 7(*e*) show an embodiment of user motion of rolling the lighting control device left and right.

The above user motions and control functions may be set by a user or set as a default. Also, above user motions and control functions may be changed. For example, in a case in which the lighting control device is shaken as shown in FIG. 7(*a*), the user motion may be linked to a function to turn the lighting apparatus on/off. Also, in a case in which the lighting control device is moved upward and downward as shown in FIGS. 7(*b*) and 7(*c*), the user motion may be linked to a function to adjust a dimming level up and down. Also, in a case in which the lighting control device is rolled left and right as shown in FIGS. 7(*d*) and 7(*e*), the user motion may be linked to a function to adjust a color temperature level up and down. However, these are illustrated only to describe a relationship between the motion of the lighting control device and the control of the lighting apparatus, and therefore, embodiments of the present disclosure are not limited to the specified assignment of a particular motion to a function nor to the listed types of motion.

In a case in which the lighting control device is shaken as shown in FIG. 7(*a*), therefore, the user motion may be linked to a function to initialize the lighting apparatus unlike the above embodiment. Also, when the user shakes the lighting control device, the lighting control device may return to a stage or state before the lighting control command is executed or may return to an initial screen of an application for lighting control. Also, the currently set value may be canceled, or the lighting control device may return to a state before the lighting control mode is executed. Alternatively, in a case in which the lighting control device is shaken, the lighting control or the application for lighting control may be ended. Alternatively, in order to distinguish the above functions or a function linked to shaking, change may be performed based on determination as to whether a predetermined item in the touch screen of the mobile device has been pressed.

Meanwhile, even in a case in which the lighting control device is moved upward and downward as shown in FIGS. 7(*b*) and 7(*c*) (or is rolled left and right), the user motion may be defined, changed, and used so as to be linked to various functions in addition to the above functions.

For example, after the application is executed in the lighting control device, the up and down/left and right motion may function to select a control target lighting or predetermined function control list. When the above motion is performed in a state in which a predetermined function button of the touch screen is pressed, level control of the corresponding function may be recognized and functioned.

Meanwhile, in a state in which a plurality of function buttons are pressed, the lighting control device may be controlled such that control related to the respective buttons is simultaneously performed. On the other hand, in a state in which a plurality of function buttons are pressed, the up and down motion may be defined as dimming control, and the left and right motion may be defined as color temperature control.

Also, in the above, the lighting control device may be linked to functions related to lighting control even in diagonal motion, rectangular motion, and clockwise or counter-clockwise circular motion in addition to the up and down/left and right motion. As previously described, on the other hand, the lighting control device may be used to control a plurality of functions and to select control target lighting.

Alternatively, after the lighting control application is executed, and the user selects control lighting and function, the lighting control device may decide a control level on the touch screen and control the control level decided with respect to the control function selected through the up and down/left and right motion to be directly applied to the corresponding lighting apparatus. That is, the corresponding level may be directly controlled through one time of motion. For example, the corresponding level may be equally controlled through a single instance of a motion according to the kind, attribute, and type of the motion.

Alternatively, during the above process, a time range or control level range may be previously set, and lighting may be gradually controlled according to a single instance of a motion or several instances of the motion.

When the control level is decided on the touch screen, the lighting control device may provide the current status of the selected function of the selected lighting and the status of the decided control level in the form of a display performance of the lighting control device, a bar graph, or a status bar such that a user can recognize the above status in advance. Moreover, the screen may be divided such that one half of the screen provides the current status and the other half of the screen provides decided control level, whereby the user can easily recognize the control degree. Consequently, control of various functions with a single input may be achieved without deciding the control level several times, thereby enhancing convenience.

In addition, the lighting control device may simultaneously or sequentially control a plurality of bulbs or flat type lighting apparatuses unlike a case in which the lighting control device is assigned to a predetermined lighting apparatus, for example, lighting control in a bedroom, e.g., a single lighting apparatus, such as a bulb or a flat type lighting apparatus.

The lighting control device may previously store a table of motion speed during up and down/left and right motion and the control level using an acceleration sensor to perform stepwise control and abrupt control based on the motion speed. Alternatively, the lighting apparatus may be controlled in a manner similar to the above based on the number of times of motion repeated similarly to the motion speed. In addition, in connection with a feedback regarding the lighting control, the lighting apparatus may variously respond to selection of the lighting apparatus or control start/end in addition to the feedback of the lighting control device.

The lighting control device may support various modes, such as a sleep mode, a reading mode, a TV watching mode, a movie watching mode, a sport mode, etc. If necessary, the lighting control device may store such modes in a state in which the modes are linked to control functions or levels of the respective functions and automatically control a corresponding mode to be active according to the up and down motion or the left and right motion when the mode is selected, for example, after the mode is pressed or the respective modes to be performed according to the up and down motion and the left and right motion without touch after a user interface for mode selection is provided. Alternatively, the lighting control device may link the modes to at least one previous color sense data or image such that the linked image or the color sense data of the image are automatically applied to the corresponding mode or the corresponding time and output.

The lighting control device may distinguish between continuous user motion and discontinuous or intermittent user motion to control the lighting apparatus based thereupon. For example, the lighting control device may determine a motion performed within 1 to 3 seconds as continuous user motion and control the motion to be linked to the previous motions. On the other hand, the lighting control device may determine a motion different from the motion performed within 1 to 3 seconds as a motion input different from previous motion inputs and control the lighting apparatus. For example, if no motion input is performed within a predetermined time, return to the previous state may be performed, the corresponding application may be ended, or the lighting control mode may be ended.

Hereinafter, a lighting control method will be described with reference to flowcharts. The lighting control method may include a step of receiving a motion of a lighting control device using a wireless transmission and receiving unit and a motion recognition sensor, a step of generating control data according to the received motion of the lighting control device, a step of transmitting the generated control data to a corresponding lighting apparatus including a wireless transmission and receiving unit, and outputting a feedback corresponding to the status of the lighting apparatus according to the control.

The feedback may include at least one selected from among of vibration, sound, UI, and screen blinking or a combination thereof.

Also, the lighting control device may distinguish the type of at least one motion of the device such as shaking, up and down, right and left, diagonal line, clockwise/counterclockwise circle, or the like, and control at least one of power on/off, color temperature, dimming of the lighting apparatus based on the distinguished type of the motion, or control another appropriate type of function.

In addition, the lighting control device may generate control data of a corresponding function level through a step of setting a critical value to control the lighting apparatus based on the device motion and a step of performing a comparison between the input data and the critical value when data regarding the device motion are input.

Also, if continuous motion data are not input within a predetermined first time, the lighting control device may perform at least one of (a) ignoring previously input motion data and waiting for a new motion data input, (b) generating control data based on the previously input motion data, or (c) returning to an initial screen if new motion data are not input before a predetermined second time. In addition, the lighting control method may further include a step of receiving status information regarding current status from the lighting apparatus and a step of deciding the attribute or level of the feedback based on the received status information.

The motion recognition sensor may include at least one of an acceleration sensor, a gyro sensor, a pressure sensor, a distance sensor, a tilt or angle sensor, a direction sensor, or another appropriate type of sensor. The lighting control device may select at least one lighting apparatus and/or functions of the selected lighting apparatuses according to a key input of a user, simultaneously control the lighting apparatuses or the functions according to the device motion. Also, the lighting control device may generate motion data of the device only when a lighting control application is executed to control the lighting apparatus. In addition, the lighting control device may be at least one of a dedicated remote controller for lighting control, a portable communication device, a portable computing device, or another appropriate type of device.

Figure 8:
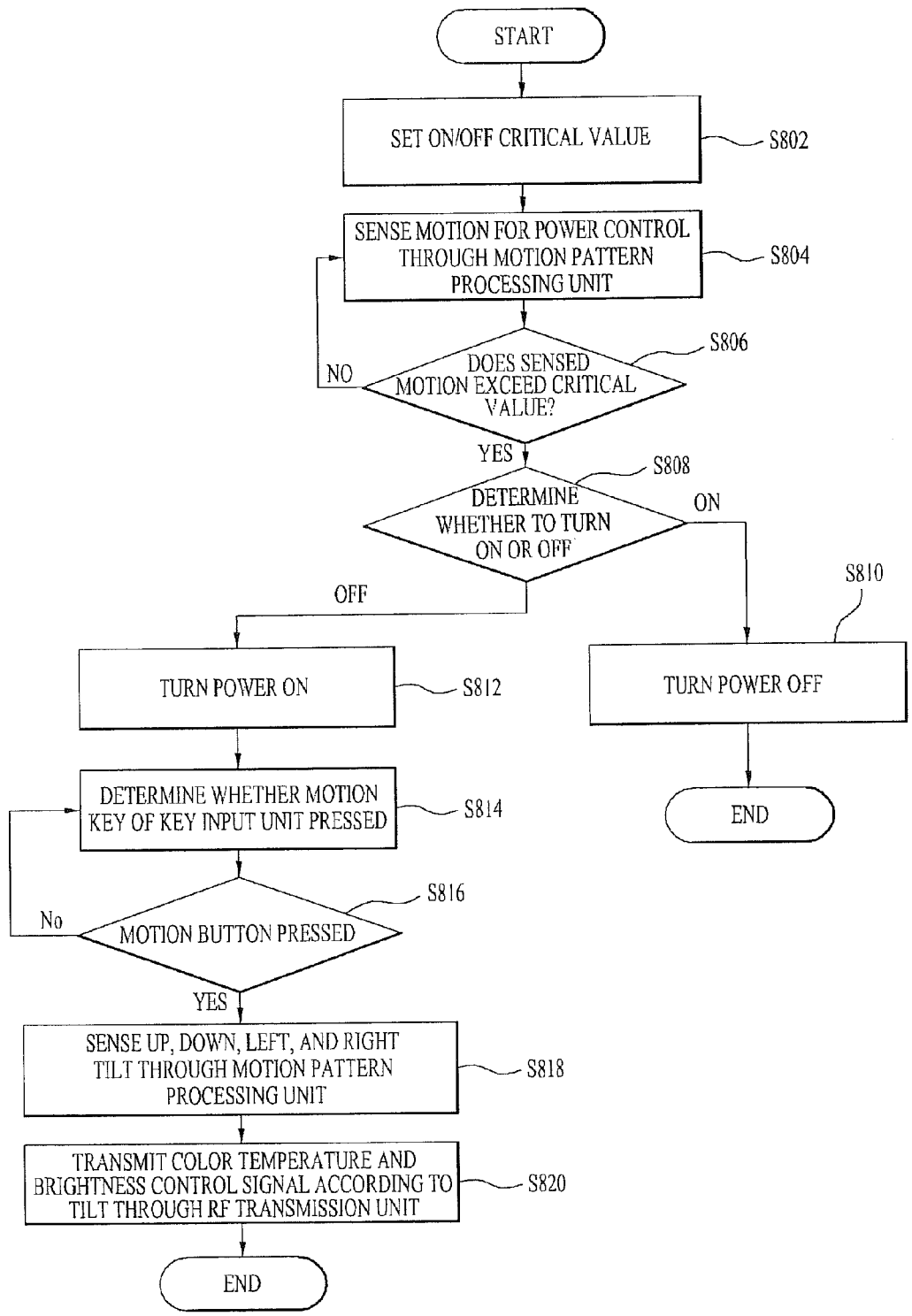
FIGS. 8 to 10 are flowcharts showing a lighting control process according to a motion of the lighting control device.
Figure 9:
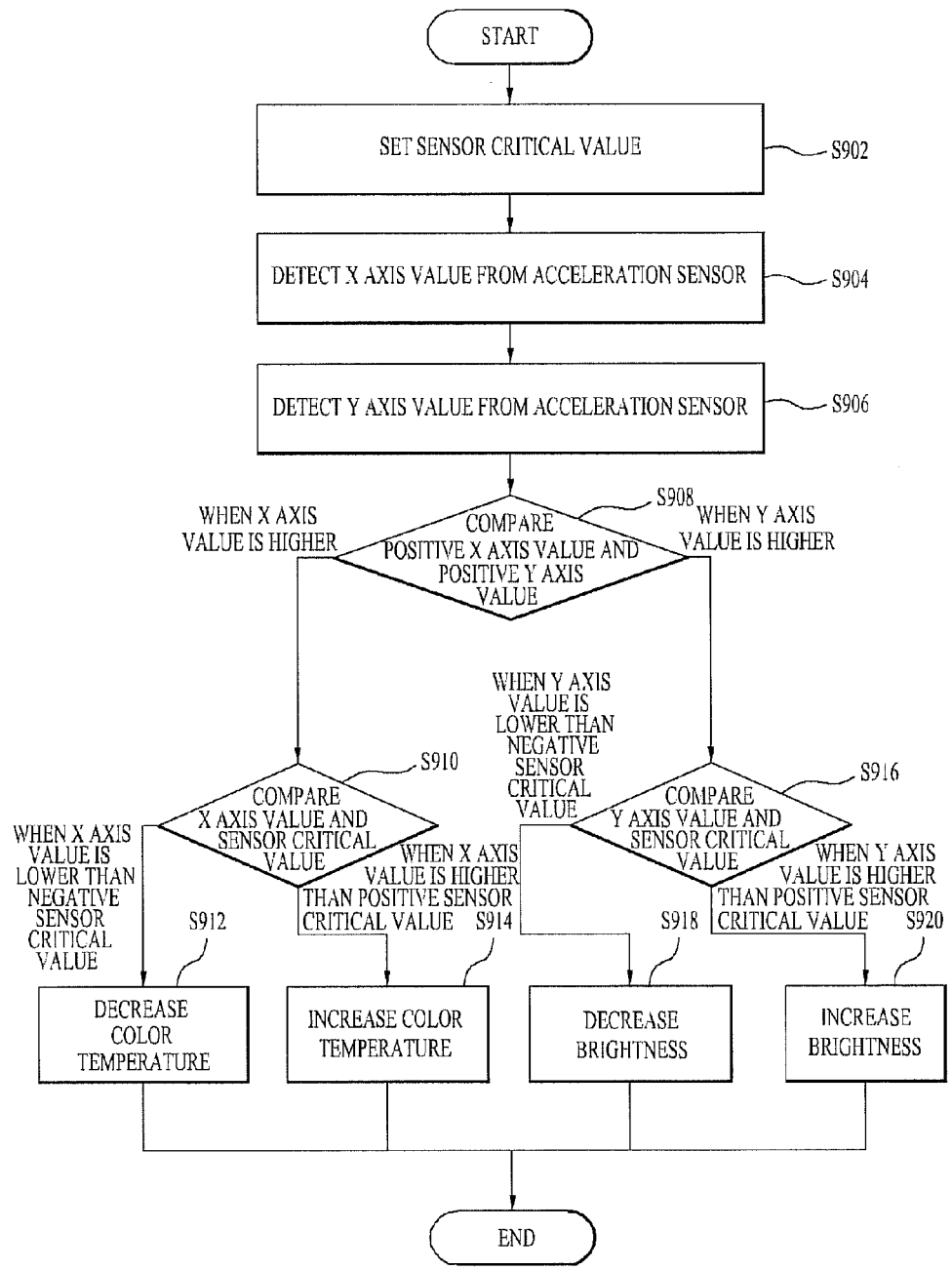
Figure 10:
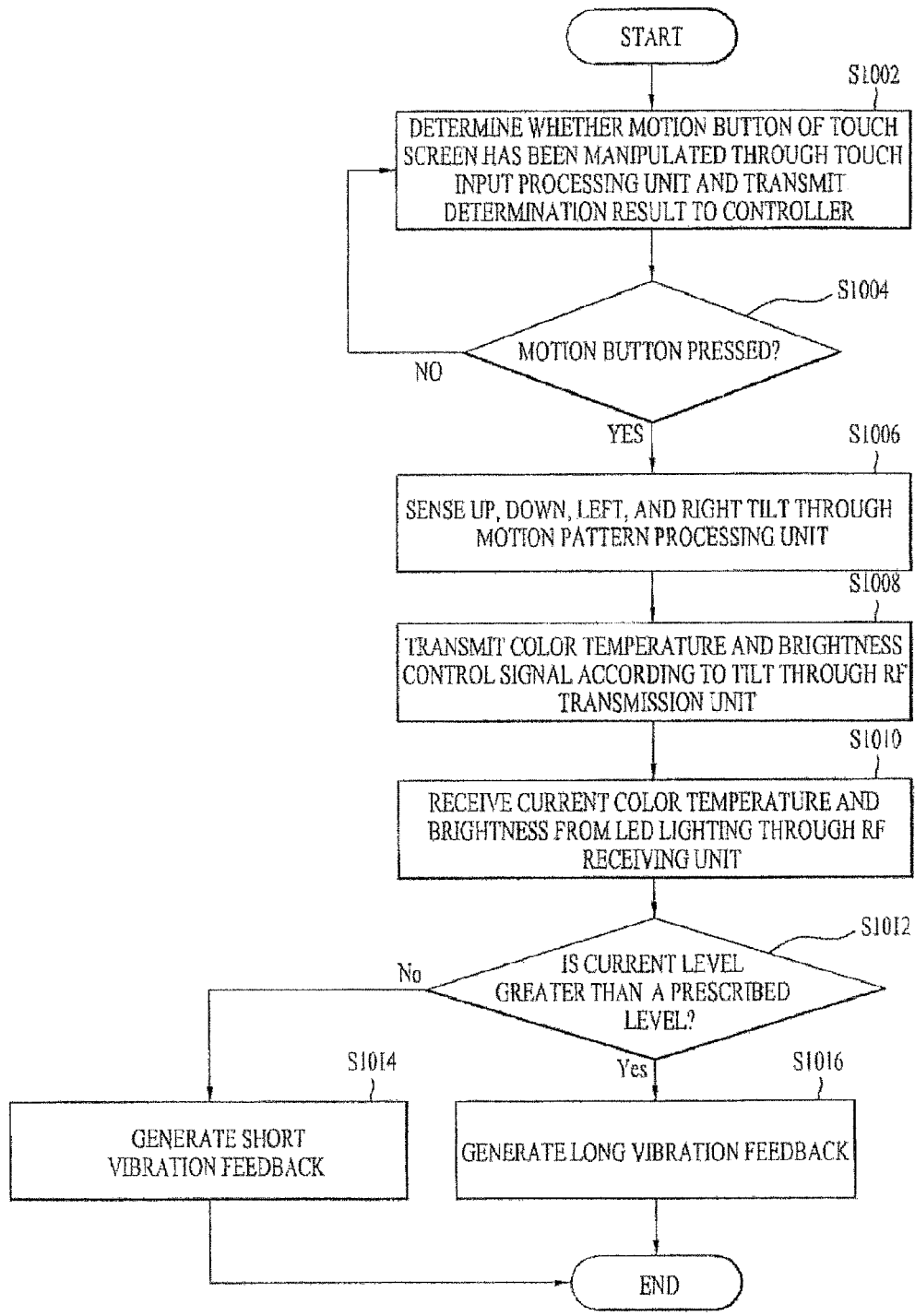

FIGS. 8 to 10 are flowcharts showing a lighting control process according to a motion of the lighting control device.

FIG. 8 is a flowchart showing an embodiment of a motion control method of the lighting control device. When a user sets an on/off critical value to the lighting control device, in step S802, the motion pattern processing unit of the lighting control device may sense a motion for power control, in step S804.

The lighting control device may determine whether the motion sensed at step S804 exceeds the critical value set at step S802, in step S806. The lighting control device may determine the current status, such as the current power on/off status, of a corresponding lighting apparatus after step S806 or during step S806, in step S808.

Upon determining at step S806 that the sensed motion exceeds the set critical value and upon determining at step S808 that the corresponding lighting apparatus is on, the lighting control device may turn off the corresponding lighting apparatus according to the motion, in step S810. On the other hand, upon determining at step S808 that the corresponding lighting apparatus is off, the lighting control device may turn on the corresponding lighting apparatus according to the motion, in step S812.

When the corresponding lighting apparatus is turned on at step S812, the lighting control device may determine whether a motion key of the key input unit has been pressed, in step S814. Upon determining that the motion key of the key input unit has been pressed, in step S816, the motion pattern processing unit of the lighting control device may sense the motion, in step S818, generate a control signal to control a dimming level and a color temperature level according to the attribute of the sensed motion, and transmit the generated control signal to the corresponding lighting apparatus through the RF transmission unit, thereby controlling the corresponding lighting apparatus through the motion of the lighting control device, in step S820.

FIG. 9 is a flowchart showing an example of a method of controlling the lighting apparatus based on a motion in detail. In this example, a three-axis acceleration sensor is used as the sensor, and functions related to dimming and/or color temperature are performed.

First, the lighting control device may automatically set a sensor critical value according to user input or as default, in step S902, and may detect an X axis value and a Y axis value of the acceleration sensor, in step S904 and S906, respectively.

The lighting control device compares the positive X axis value and the positive Y axis value of the acceleration sensor with each other and may control different functions to be performed when the X axis value of the acceleration sensor is higher or when the Y axis value of the acceleration sensor is higher, in step S908.

For example, in a case in which the X axis value of the acceleration sensor is higher at step S908, the X axis value of the acceleration sensor may be compared with the sensor critical value, in step S910. If the X axis value of the acceleration sensor is lower than the negative sensor critical value, the color temperature level may be decreased, in step S912, and, if the X axis value of the acceleration sensor is higher than the positive sensor critical value, the color temperature level may be increased, in step S914. In this case, if the X axis value of the acceleration sensor is between the negative sensor critical value and the positive sensor critical value, which means that the X axis value of the acceleration sensor is within a range of critical value, no function level control may be performed. Meanwhile, in the above control method, dimming may be controlled in addition to the color temperature.

Also, in a case in which the Y axis value of the acceleration sensor is determined to be higher at step S908, the Y axis value of the acceleration sensor is compared with the sensor critical value, in step S916. If the Y axis value of the acceleration sensor is lower than the negative sensor critical value, the brightness (dimming) level may be decreased, in step S918, and, if the X axis value of the acceleration sensor is higher than the positive sensor critical value, the brightness level may be increased, in step S920. In this case, if the Y axis value of the acceleration sensor is between the negative sensor critical value and the positive sensor critical value, which means that the Y axis value of the acceleration sensor is within a range of critical value, no function level control may be performed. Meanwhile, in the above control method, color temperature may be controlled in addition to the brightness.

FIG. 10 is a flowchart showing an example of a method of controlling a lighting control application. The lighting control device may determine whether the motion button of the touch screen has been manipulated through the touch input processing unit and transmit the determination result to the controller, in step S1002.

The controller may determine whether the motion button has been pressed, in step S1004. Upon the controller determining at step S1004 that the motion button has been pressed, the motion pattern processing unit may sense a motion, e.g., an up and down, and left and right tilt of the lighting control device, in step S1006. The controller may generate a control signal to control a dimming or color temperature level based on the sensed motion data, and transmit the generated control signal to a corresponding lighting apparatus through the RF transmission unit, in step S1008.

Subsequently, the controller may periodically or non-periodically receive status information regarding the current temperature color or the current dimming from the corresponding lighting apparatus through the RF receiving unit and may store the received status information, in step S1010. The controller may determine the current level of the lighting apparatus based on the received status information of the lighting apparatus, in step S1012. For example, if the current level of the lighting apparatus is the minimum, the controller may control a short vibration feedback to be generated, in step S1014, and, if the current level of the lighting apparatus is the maximum, the controller may control a long vibration feedback to be generated, in step S1016.

Meanwhile, on the assumption that the function level has four steps, the controller may control vibration to be generated shortly three times when the step of the current level is a third step such that easier recognition can be achieved according to the respective steps of the function level.

In addition, the controller may generate sound through a speaker or provide a related graphical user interface (GUI) either together with the vibration feedback or in lieu of the vibration feedback such that the user can easily recognize the function.

As described above, it is possible to control a lighting apparatus connected to a lighting control device via a wired/wireless network using the lighting control device. Meanwhile, it is possible to control the lighting apparatus through the motion of the lighting control device without performing several complicated processes. In a case in which the lighting apparatus is controlled through the lighting control device, a feedback according to a control command may be provided for the user's convenience in controlling the lighting. Also, it is possible to improve user's convenience, product satisfaction, and marketability through the lighting system including the lighting apparatus and the lighting control device to control the lighting apparatus.

Figure 11:
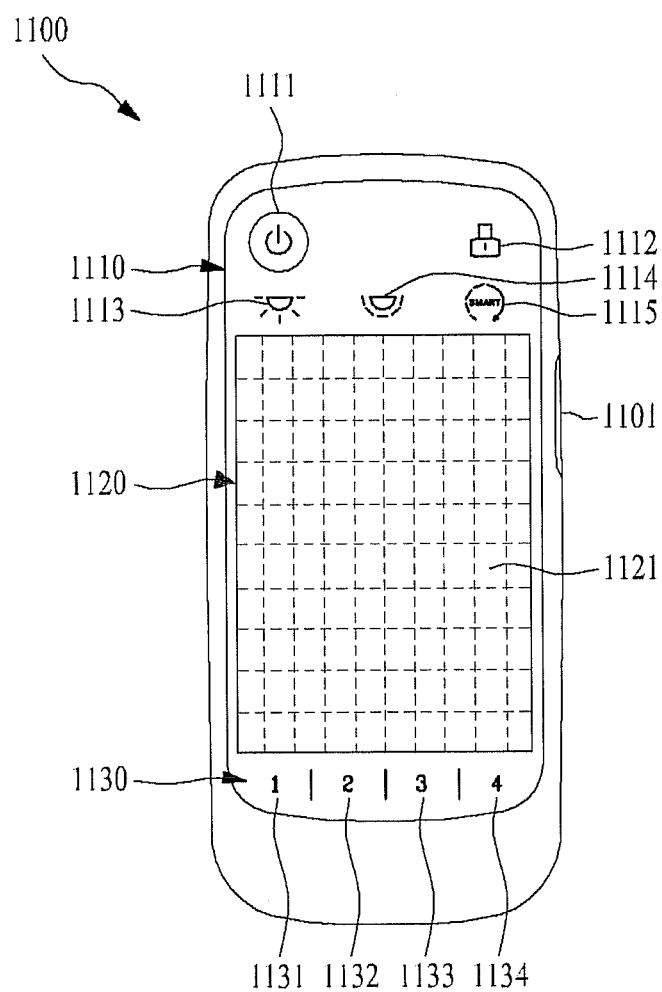
FIG. 11 is a view showing the lighting control device or a touch screen included in the lighting control device.

FIG. 11 is a view showing the lighting control device or the touch screen included in the lighting control device. The lighting control device 1100 may include a front part and a side part. The front part of the lighting control device 1100 may be divided into three regions. At the side part of the lighting control device 1110 may be provided a button designated as a hold button 1101 to control a user input to perform overall functions and an operation based thereupon in a state in which the lighting control device is on. In this example, the hold button 1101 is provided at a portion of the side part, for example a right side part, of the lighting control device 1100. However, embodiments of the present disclosure are not limited thereto. For example, the hold button may be provided at a left side part, an upper side part, or a lower side part of the lighting control device. Also, a power button or a predetermined function button may be further provided at the side part of the lighting control device in addition to the hold button 1101.

Hereinafter, the front part of the lighting control device 1100 will be described in detail. In the following description, the front part of the lighting control device 1100 may be divided into a first region 1110, a second region 1120, and a third region 1130, as previously described.

First, the first region 1110 may be located at the upper part of the lighting control device 1100. The first region 1110 may include a shade power button 1111 to turn on/off the lighting control device 1100, a hold display icon 1112 to display whether the lighting control device is held according to selection of the hold button 1101 provided at the side part of the lighting control device, and first function icons 1113, 1114, 1115.

The power button 1111 may be realized as, for example, a tactile switch together with the hold button 1101 provided at the side part of the lighting control device 1100. Also, a backlight light emitting diode (LED) provided in the power button 1111 or the hold display icon 1112 may be turned on/off such that a user can immediately recognize whether the lighting control device 1100 is on/off and whether a hold function is activated. Also, in a case in which the hold button 1101 is not provided at the side part of the lighting control device, the hold button may be realized as a tactile switch in the first region 1110 together with the power button 1111. In addition, a side knob may be applied to the hold button provided at the side part of the lighting control device, and the position of the hold button may be changed.

The first function icons 1113, 1114, 1115 may include at least one of a direct light selection function icon 1113, and an indirect light selection function icon 1114 based on the type of a light emitting unit, and a smart function icon 1115 to control a smart mode operation with respect to a direct light and/or an indirect light, or another appropriate function icon. In other words, when a user selects at least one of a direct light selection function, an indirect light selection function, or a smart function through the lighting control device, the selected function may be displayed to indicate its activated state. Although the first function icons 1113, 1114, 1115 display whether the corresponding functions are activated in the form of icons in this example, the first function icons may be realized in the form of touch keys or tactile switches like the above power button 1111 and the hold button 1101 such that the corresponding functions can be directly selected. Also, each of the first function icons may adopt a backlight LED. A yellow-green LED may be used as the backlight LED. Consequently, the first function icons may display whether corresponding functions are activated as previously described.

The first function icons 1113, 1114, 1115 are provided for a kind of group control. In a case in which identical control is impossible according to characteristics of the light emitting unit, the first function icons 1113, 1114, 1115 are provided for the user's convenience. Meanwhile, the smart function may be realized or controlled although the direct light or the indirect light is not selected.

The first function icons 1113, 1114, 1115 are provided to select the light emitting unit or perform the smart function. On the other hand, second function icons 1131, 1132, 1133, 1134 of the third region 1130 are provided to perform various mode control functions. The mode control functions may include, for example, a meal mode, a wine mode, a teatime mode, a reading mode, or the like. Icons for the corresponding modes may be provided such that users can easily recognize the modes. Although special icons are not provided as shown in FIG. 11, specially requested modes may be stored and used according to user selection. In this case, various modes may be provided in addition to the above modes. First to n-th (n being a positive integer) modes may be stored in the memory according to user selection and may display whether corresponding functions are activated. Meanwhile, a light emitting mode may be operated in a contextual mode including a plurality of mode icons preset in consideration of at least one of time, weather, user intention, the surroundings, or the like, with respect to the icon selected in the third region 1130.

Figure 12:
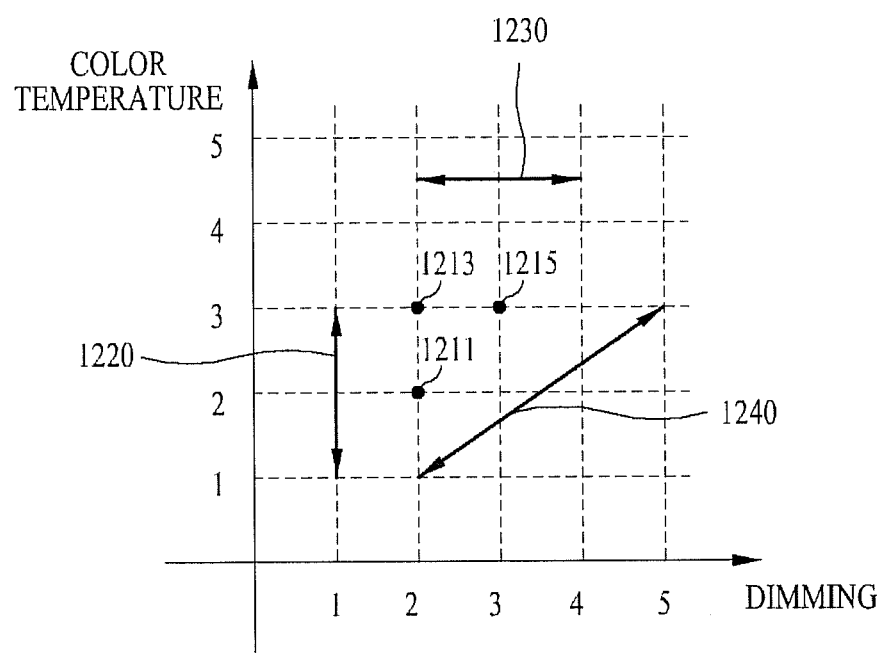
FIG. 12 is a view showing embodiments of a relationship between the touch screen and lighting control according to touch and drag.

The second region 1120 may include a touch screen 1121. For example, a gradation of n points×m points as shown in FIGS. 11 and 12 may be applied to the touch screen 1121. Meanwhile, the touch screen of the second region may recognize user input through, for example, the gradation to minutely and more accurately control color temperature and dimming. For example, 256-step control is possible. Control of the color temperature and the dimming will be described in detail with reference to FIG. 18, which will hereinafter be described.

Meanwhile, the touch screen 1121 of the second region 1120 may be interlocked with the first region 1110 and the third region 1130 in addition to the input for control. Alternatively, the touch screen 1121 of the second region 1120 may display various data or output the data together with audio. For example, in a case in which the lighting control device is on, it is possible to display the on-state of the lighting control, remaining battery power of the lighting control device, a memory status (total capacity, available capacity, etc.), whether the hold button is activated, whether a predetermined function is activated, whether the light emitting unit selected together with map information is displayed when the first function icons 1113, 1114, 1115 are selected through the touch screen 1121 of the second region 1120, or the like. In other words, the touch screen 1121 of the second region may perform a window function to display various functions of the lighting control device and provided related data, together with means to input point information for lighting control.

In the above, examples of the first function icons 1113, 1114, 1115 and the second function icons 1131, 1132, 1133, 1134 were illustrated. However, the first function icons and the second function icons are not limited to the illustrated examples. The first function icons and the second function icons may be realized in a specific region of the lighting control device at various positions and in various forms for the user's convenience. For example, the positions of the first function icons and the positions of the second function icons may be interchanged. The second function icons may be located under the first function icons, or the first function icons may be located under or above the second function icons. The first function icons and/or the second function icons may be aligned vertically rather than horizontally on the display.

In addition, the region in which the first function icons and/or the second function icons are disposed may be provided in the form of a touch screen instead of fixed icons, and corresponding icons may be provided according to user selection. In this case, the first function icons and/or the second function icons may be included in the touch screen 1121 of the second region such that the first function icons and/or the second function icons can be displayed in predetermined regions only according to user request. Meanwhile, the entirety of the lighting control device 1100 may be configured in the form of a touch screen. In this case, the above function icons may be displayed in predetermined regions of the touch screen all the time or only according to function request.

The lighting control device may enter into a sleep mode to reduce power consumption a predetermined amount of time after the final key input is performed. The predetermined time may be, for example, 10 seconds. In the sleep mode, some buttons, such as the power button, or some icons may be realized such that LED brightness of the buttons or the icons can be adjusted or pictographs of the buttons or the icons can be displayed at predetermined power levels, and therefore, at least the position of the lighting control device can be recognized. When a user presses a specific button while in the sleep mode such as the power button or the hold button, or a specific region such as the touch region, the sleep mode may be released, and the lighting control device enters into a wake-up mode. The wake-up mode is opposite to the sleep mode. In the wake-up mode, various functions may be performed according to selection of corresponding buttons or icons. Even when any portion of the front part or the side part of the lighting control device is touched instead of a specific button or icon to release the sleep mode of the lighting control device, the sleep mode may be released, and the lighting control device may enter into a wake-up mode.

As previously described, the touch screen of FIG. 11 may serve as means to control color temperature and dimming of the light emitting unit.

FIG. 12 is a view showing embodiments of a relationship between the touch screen and lighting control according to touch and drag, and FIG. 13 is a view showing embodiments of control scenarios of FIG. 12. Simply for ease of description FIG. 12 illustrates a situation in which the touch screen of FIG. 11 is used as a rectangular coordinate system to execute a lighting control method. The rectangular coordinate system corresponds to, for example, the gradation of n points×m points as previously described.

In FIG. 12, the vertical axis Y indicates a color temperature level, and the horizontal axis X indicates a dimming level for the sake of convenience. However, embodiments of the present disclosure are not limited thereto. That is to say, the vertical axis Y may indicate a dimming level, and the horizontal axis X may indicate a color temperature level. Also, numbers of the vertical axis Y and the horizontal axis X may indicate previously assigned control levels for the sake of convenience. The control levels may be previously stored in the memory of the lighting control device in the form of a table. Consequently, a control degree may be preset for each level.

Referring to FIG. 12, the color temperature level and the diming level may be individually or simultaneously controlled. Of course, other functions may be controlled in the same manner according to user selection in addition to the color temperature and the dimming.

For example, when a user wishes to control the color temperature or the dimming through the lighting control device, the user may activate one of the functions and touch a desired point.

In this case, a grid may be formed as shown in FIG. 11 for the user's convenience. For example, three points, such as a first point 1211, a second point 1213, and a third point 1215, are shown in FIG. 12. The first point 1211 may control the color temperature level or the diming level to a second level according to a requested function. Of course, in a case in which two functions are simultaneously requested, both the color temperature level and the diming level may be controlled to the second level.

In this case, the controller 530 of the lighting control device receives information regarding the point touched by the user from the touch unit 520, compares the received point information with the previously requested function to decide a control level corresponding to the point information, generates a control signal to control a function level of a corresponding light emitting unit to the request level, and transmits the generated control signal. The second point 1213 may induce point information regarding dimming having a second level and color temperature having a third level, and the third point 1215 may induce point information regarding dimming having a third level and color temperature having a third level. The induced point information is transmitted to the controller 530 via the touch unit 520 such that the induced point information can be used to generate a control level.

In this case, the touch screen 1121 of the lighting control device may be divided into left and right regions and upper and lower regions, and colors may be displayed in the respective regions such that the user can more easily perform control according to the degree of the lighting control level. For example, a blue color may be provided at the left region of the touch screen, and a red color may be provided at the right region of the touch screen. The concentration of the colors may be changed in the vertical direction or in the horizontal direction such that the level is increased as the colors become dark and the level is decreased as the colors become light for the user's convenience in selection. Also, in a case in which only one color is used, the concentration of the color may be increased from the left lower side to the right upper side of the touch screen as shown in FIG. 12 for the user's convenience in selection. However, embodiments of the present disclosure are not limited thereto. Various methods may be adopted for the user's convenience in recognition and/or selection.

The above description is related to, for example, a case in which a user touches at least one point. Meanwhile, the user may not touch a predetermined point of the touch screen but may drag a predetermined point after the point is touched.

The drag input may include a first drag 1220 in the vertical direction, a second drag 1230 in the horizontal direction, and a third drag 1230 in the diagonal direction. In case of the first drag 1220 and the second drag 1230, it may not be necessary to select a pre-control function. For example, the first drag 1220 is performed only in the vertical direction. As a result, a control level of the color temperature may be determined, but a control level of the dimming may not affected. Also, the second drag 1230 is performed only in the horizontal direction. As a result, a control level of the dimming may be determined, but a control level of the color temperature may not be affected.

In case of the first drag 1220, the touch unit 520 may collect information regarding a plurality of points, including a first point to an n-th point. At this time, the touch unit 520 may extract first point information regarding the first touched portion and second point information regarding the last touched portion and transmit the extracted information to the controller. The controller 530 may calculate the difference in levels or values between the second point information and the first point information input from the touch unit 520 to decide a control level, generate a control signal based on the decided control level, and transmit the generated control signal to a corresponding light emitting unit. The control signal may be generated based on, for example, information regarding the current level of the corresponding light emitting unit. In other words, if the decided control level is a second level, the controller 530 may generate a control signal to change the current level of the corresponding light emitting unit to the second level, and transmit the generated control signal to the corresponding light emitting unit. Alternatively, the controller 530 may receive information regarding the current level of the corresponding light emitting unit, calculate a value different from the current level to be two levels, generate a control signal containing a level based on the calculated value, and transmit the generated control signal to the corresponding light emitting unit.

The second drag 1230 is identical to the first drag 1220 except that the second drag 1230 is not performed in the vertical direction but is performed in the horizontal direction.

Also, the controller 530 may increase and decrease the first point and the second point based on a first touch point and a second touch point. If the value is positive, the level may be increased, and, if the value is negative, the level may be decreased. The positive value indicates a case in which the level of the first touch point is lower than that of the second touch point, and the negative value indicates a case in which the level of the first touch point is higher than that of the second touch point.

In case of the first drag 1220 and the second drag 1230, only the color temperature level and the dimming level, respectively, may be individually controlled. In case of the third drag 1240, on the other hand, the drag is performed in the diagonal direction. In this case, it is possible to simultaneously control the color temperature and the dimming using information regarding a plurality of touch points of the touch unit 520 in the same manner as in the first drag 1220 and the second drag 1230.

For example, the touch unit 520 may extract first point information regarding the first touched portion and second point information regarding the last touched portion and transmit the extracted information to the controller in the same manner as in the first drag 1220 and the second drag 1230. Alternatively, the touch unit 520 may also provide a third point information regarding an intersection between the horizontal axis and the vertical axis of a rectangular coordinate system together with the first point information regarding the first touched portion and the second point information regarding the last touched portion. Referring to FIG. 12, on the assumption that the dimming corresponds to an X coordinate on the X axis and the color temperature corresponds to a Y coordinate on the Y axis of the rectangular coordinate system, coordinate (2, 1) is first point information, (5, 3) is second point information, and (5, 1) is third point information.

When the touch unit 520 transmits the above coordinates of the rectangular coordinate system, i.e., a plurality of pieces of point information, to the controller 530, the controller 530 may decide control levels of the color temperature and the dimming using the input point information to generate a control signal and transmit the generated control signal to a corresponding light emitting unit. In this case, the control signal may be individually generated with respect to the color temperature and the dimming. Alternatively, the control signal may be commonly generated with respect to the color temperature and the dimming. For example, in case of the third drag shown in FIG. 12, the controller 530 may generate a control signal to control the dimming to have a third level and the color temperature to have a second level based on the third point information.

Also, the controller 530 may generate a control signal to control the dimming and the color temperature to have the same level according to point information regarding the dimming and the color temperature. For example, in case of the third drag 1240, the controller 530 may control the dimming and the color temperature to have the same level (for example, both the dimming and the color temperature have k level, where k is a positive integer) according to a drag degree based on information regarding a plurality of points, and may previously define values based on the point information in the form of a table.

Figure 13A:
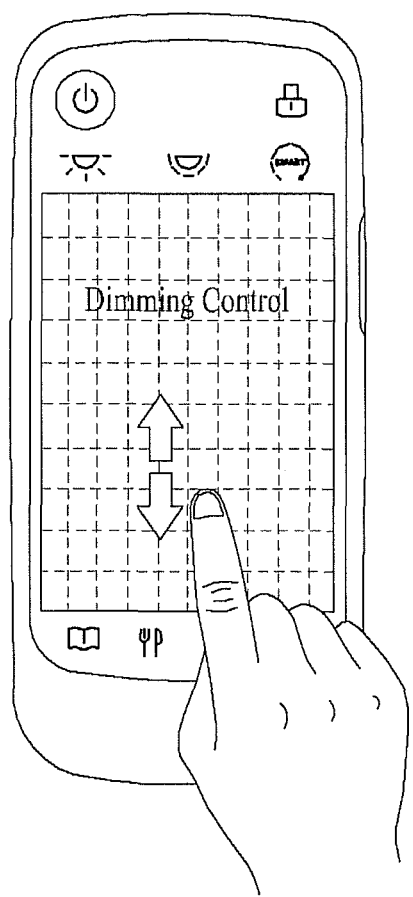
FIGS. 13A to 13C are views showing embodiments of control scenarios of FIG. 12.
Figure 13B:
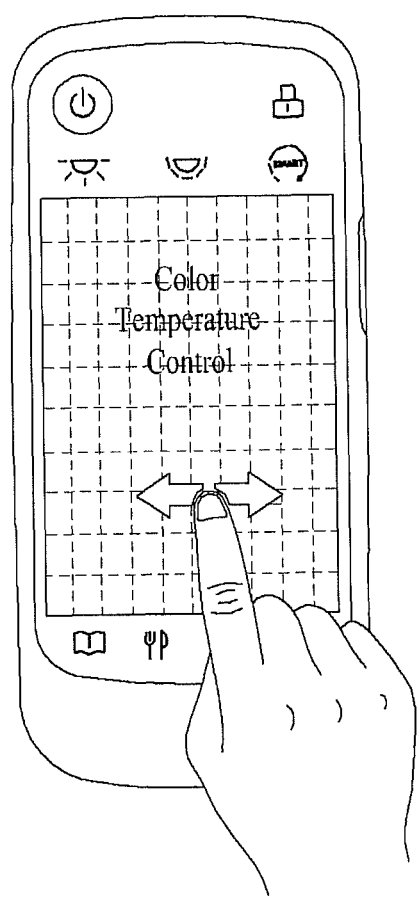
Figure 13C:
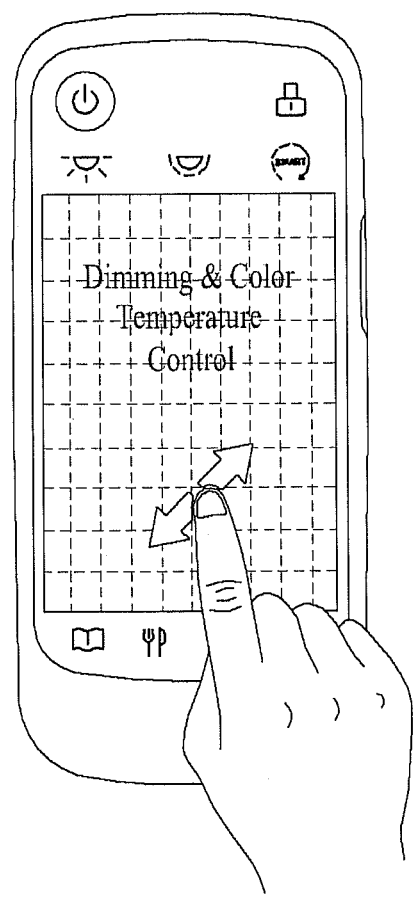

FIGS. 13A to 13C show examples of a dimming control operation, a color temperature control operation, and a dimming and color temperature control operation. Here, a touch and drag input in the vertical direction may be performed to control dimming, and a touch and drag input in the horizontal direction may be performed to control color temperature, unlike FIG. 12. Functions of the lighting control device may be predefined. Alternatively, functions of the lighting control device may be changed or modified according to user selection.

In this embodiment, color temperature and dimming are controlled. However, embodiments of the present disclosure are not limited thereto. For example, the lighting control device may be set to define or control various functions according to user selection.

In the above description, in a case in which the controller 530 generates a control signal according to the point information of the touch unit 520, the control signal is transmitted to control a corresponding light emitting unit after all touch operations are completed. In this case, however, it may be necessary to perform several touch and control operations in order to accurately perform control at a level desired by a user. In order to solve this problem, in case of the touch and drag, information regarding the touch point may be directly transmitted to the controller 530 every touch from the first touched portion although the touch is not completed, and the controller 530 may generate a control signal and transmit the corresponding light emitting unit. That is, the lighting may implement the changes instantaneously to provide feedback to the user. As a result, the user may directly determine to what extent the current touch status of the lighting control device is controlled using visual feedback from the lighting such that the control process can be completed through a single touch and drag input. In this case, the corresponding function of the light emitting unit may be controlled, and therefore, the user may determine the control degree based on the touch with the naked eye such that the control process can be completed through a single touch and drag input.

Moreover, in addition to dimming and color temperature, the displayed grid of FIG. 13 may be used to select a color using, for example, a color palette displayed on the screen. Here, various touch inputs may be used to change the color of the light source based on the color selected on the color palette. Furthermore, it should be appreciated that the dimming and color temperature as well as color or another appropriate control function may be controlled using other types of input interfaces such as scroll bars, or the like.

Figure 15:
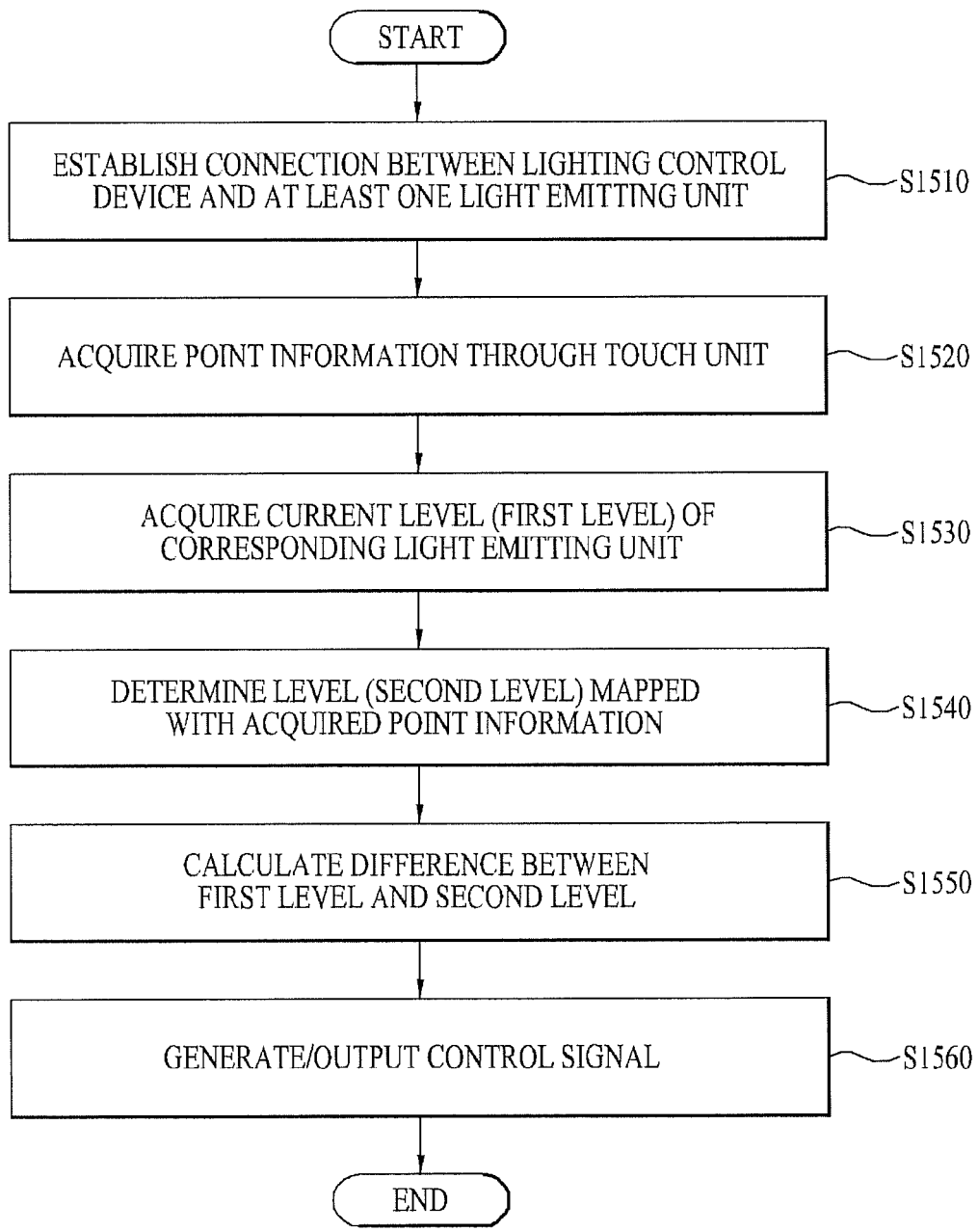
Figure 16:
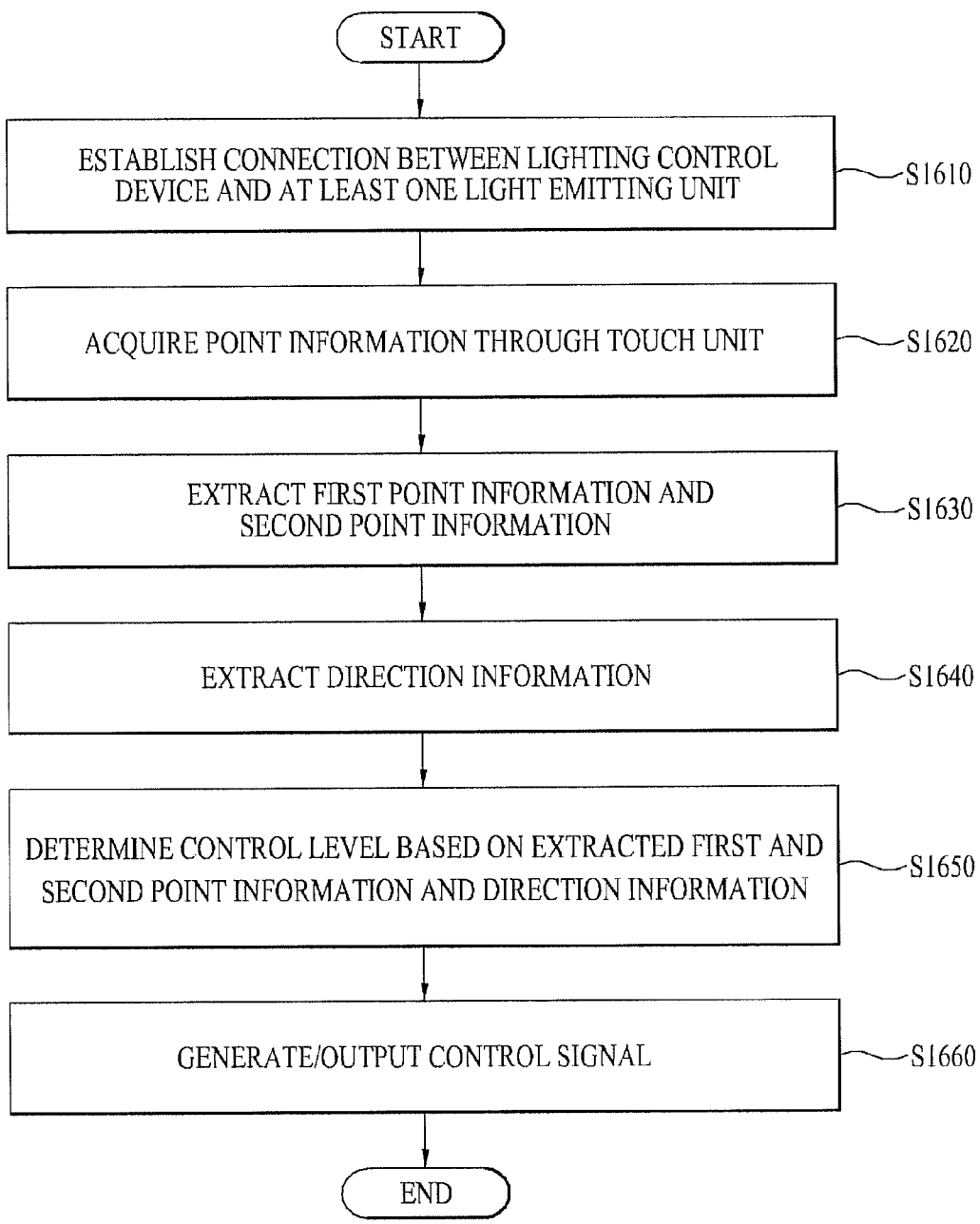

FIGS. 14 to 16 are flowcharts showing a lighting control process according to touch in the lighting control device. Referring to FIG. 14, which shows an example of a lighting control method using the lighting control device, the lighting control device is connected to at least one light emitting unit, in step S1410. Connection between two devices may indicate a process to perform transmission and reception of data between the devices through, for example, the aforementioned specific communication protocols. This process may be referred to as an initialization process, which is performed before a control process.

When the lighting control device is connected to the light emitting unit at step S1410, the lighting control device may acquire a control degree, e.g., point information, desired by a user through the touch screen, in step S1420. This process may be performed by the touch unit 520. In a case in which a plurality of pieces of point information exists as previously described, the touch unit 520 may individually extract first point information and second point information or first point information to third point information and transmit the extracted point information to the controller 530. Alternatively, whenever point information is generated, the touch unit 520 may immediately transmit the generated point information to the controller 530.

The controller 530 decides a control level based on the acquired point information, in step S1430. This process may be performed in the same manner as in FIG. 12. The controller 530 may generate a control signal according to the control level decided at step S1430 and transmit the control signal to the light emitting unit such that the light emitting unit can be controlled according to the control signal, in step S1440.

Next, another example of a lighting control method using the lighting control device will be described with reference to FIG. 15. A detailed description will be omitted of steps of the lighting control method according to this example identical to those of the lighting control method according to the previous example. In other words, steps S1510 and S1520 of FIG. 15 are identical to steps S1410 and S1420 of FIG. 14, and therefore, a detailed description thereof will be omitted.

The controller 530 may acquire point information from the touch unit 520 and information regarding the current level (first level) of a corresponding light emitting unit simultaneously when the point information is acquired, before the point information is acquired, or after the point information is acquired, in step S1530, and decide a level (second level) mapped with the acquired first level and the point information acquired by the touch unit 520, in step S1540. The controller may then calculate the difference between the first level and the second level, in step S1550.

The controller 530 may generate a control signal to control the corresponding light emitting unit to a specific level according to the difference between the first level and the second level and transmit the generated control signal to the corresponding light emitting unit, in step S1560.

The second level may be decided based on, for example, first point information and second point information or first point info nation to third point information. Alternatively, the mapping level of the second level may be decided based upon a predetermined mapping table.

As previously described, the control signal may be transmitted to the light emitting unit in a state in which the level difference is contained in the control signal such that the level is increased or decreased by a corresponding level value. Alternatively, the controller may previously calculate the level difference, decide a value corresponding to the level difference, and transmit a control signal including the decided level value to the light emitting unit such that the level of the light emitting unit can be changed to the corresponding level. That is, in the former case, the different level is transmitted to control the light emitting unit based on the different level. In the latter case, a level to be changed is specified based on the different level calculated by the controller and the current level of the light emitting unit, and the light emitting unit is controlled based on the specified level.

FIG. 16 is similar to FIG. 15, and therefore, only construction of FIG. 16 different from that of FIG. 15 will be described. In FIG. 16, direction information may be added to the construction of FIG. 15.

Upon receiving point information at steps S1610 and S1620, the controller may extract first point information and second point information or first point information to third point information from a plurality of pieces of point information, in step S1630. In addition, the controller may extract direction information, in step S1640, decides a control function and a control level based on the extracted point information and the extracted direction information, in step S1650, generate a control signal according to the decided control level, and transmit the generated control signal to a light emitting unit such that the light emitting unit can be controlled according to the control signal.

FIG. 17 is a view showing embodiments of an image processing method, such as color sense data generation, for color sense reproduction in the lighting apparatus. In describing FIG. 17, FIG. 6(b) will be referred to for the sake of convenience.

In order to process image data, the construction blocks of FIGS. 1 to 6 as described above may be used. Moreover, the image processing method may be provided in the form of an application such that the lighting control device can be set as a lighting control means according to the characteristics of the lighting control device. As the application is executed, the lighting control device may perform lighting control, e.g., image data processing.

For example, FIG. 17(a) shows image capture as an example of an image acquisition process through the lighting control device, and FIGS. 17(b) to 17(d) show image processing methods. Once the image is displayed, a particular region of the image may be selected for use in controlling the lighting. The selected region may be adjusted by inputs on the display screen, and may be a selection of regions of various sizes or a prescribed point in the image. Moreover, the image need not be captured (e.g., a picture photographed and stored), but may be focused using the camera to be displayed on the screen for use in selecting a color or color pattern. The image processing methods may include a mosaic pattern processing method, a gradation pattern processing method, and a color percentage pattern processing method. Specifically, FIG. 17(b) shows the mosaic pattern processing method, FIG. 17(c) shows the gradation pattern processing method, and FIG. 17(d) shows the color percentage pattern processing method.

As previously described, 17(b) to 17(d) show criteria on how color sense data to be applied to the lighting apparatus are processed and configured. Referring FIG. 17(b), the lighting control device may crop or resize a selected or photographed image and set a mosaic interval pixel size. At this time, such setting may be performed with reference to the width of the image, the number of LED elements in the horizontal direction, the height of the image, and the number of the LED elements in the vertical direction. The lighting control device may extract RGB values in unit of the pixel size set as described above. The lighting control device may generate pixels having the extracted RGB values. The above process may be performed with respect to each of the pixels assigned to the cropped or resized image such that the light emitting unit of the flat type lighting corresponding to the respective pixels or the flat type lighting corresponding to the respective pixels outputs various color senses.

Alternatively, the lighting control device may reflect the input image data to the lighting in the form of a mosaic. To this end, the image processing unit 656 may divide the input image data in the form of a mosaic, e.g., into mosaic units having predetermined ranges, and extract color sense data (for example, color temperature data) corresponding to the respective mosaic units.

The image processing unit 656 may compare the extracted color sense data with color sense data that can be realized in the lighting apparatus to decide and configure the optimum lighting control color sense data. In deciding and configuring the lighting control color sense data, the color sense data of only the corresponding mosaic may be referred to, or the color sense data of a mosaic adjacent to the corresponding mosaic within a predetermined range may be referred to. Also, in deciding the lighting control color sense data, in a case in which there are no color sense data that can be realized in the lighting apparatus, color sense data of the corresponding mosaic may be decided by referring to color sense data closer to the border color sense data or color sense data of the aforementioned neighboring mosaic. On the other hand, a predetermined number of, for example 6, mosaics may be decided as a reference unit of lighting control color sense data instead of one mosaic such that color sense data can be decided and configured. In this case, a gradation method or a color percentage method may be used with respect to a plurality of mosaics.

The controller 658 may generate link data linked to a plurality of light emitting diodes belonging to a lighting apparatus, such as a flat type lighting apparatus, based on the lighting control color sense data generated by the image processing unit 656. The link data may be combined to generate a control signal with respect to the flat type lighting apparatus. On the other hand, in a case in which a plurality of flat type lighting apparatuses is provided, the mosaic may be appropriately assigned and linked to the respective flat type lighting apparatuses, and color sense data and link data are generated with respect to the mosaics corresponding to the respective flat type lighting apparatuses. As a result, the aforementioned lighting control signal may be transmitted.

Consequently, it is possible to output various color senses corresponding to an image through one flat type lighting apparatus or to output the same color senses through a plurality of flat type lighting apparatuses.

Referring to FIG. 17(c), a color range may be selected from the input image data, and the selected color may be reflected in lighting as a gradation. The image processing unit 640 may extract data on a color range from an image, and automatically or manually selects a desired or appropriate color range from the extracted color range.

The image processing unit 656 may decide a color corresponding to the selected color range and decide a gradation degree corresponding to the decided color to generate gradation data. The controller 658 may transmit the gradation data, received from the image processing unit 656, to a flat type lighting apparatus such that the flat type lighting apparatus outputs a gradation effect corresponding to the received gradation data.

On the other hand, in a case in which the controller 658 simultaneously controls a plurality of flat type lighting apparatuses, the controller 658 may control the respective flat type lighting apparatuses to have the same gradation effect or different gradation effects. For example, the controller 658 does not select one color from the color range output from the image but selects colors corresponding to the flat type lighting apparatuses to be controlled and arranges the selected colors with respect to the respective flat type lighting apparatuses such that the flat type lighting apparatuses can appropriately output gradation effects.

Referring to FIG. 17(d), one of RGB colors which is the most distributed in the input image is determined from input image data and is reflected in the lighting apparatus. The image processing unit 656 may extract data regarding the RGB colors from the image and calculates percentages of the RGB colors from the extracted data. The image processing unit 656 may decide one color which is the most distributed from the RGB colors based on the calculated percentages of the RGB colors to generate the color sense data.

The controller 658 may transmit a control signal containing the color sense data decided and generated by the image processing unit 656 to the lighting apparatus such that the lighting apparatus can express color sense corresponding to the data. Meanwhile, in a case in which a plurality of flat type lighting apparatuses is controlled by the controller 658, the controller 658 may apply the most distributed color to all of the flat type lighting apparatuses in a bundle. Alternatively, the controller 658 may control the respective flat type lighting apparatuses to have colors appropriately corresponding to R, G, and B.

At this time, R, G, and B may be controlled at the same degree of luminous intensity based on the distribution ratio thereof. For example, it is assumed that a certain image has a distribution ratio of 50% R, 30% G, and 20% B. In a case in which a R color is assigned to first lighting, a G color is assigned to second lighting, and a B color is assigned to third lighting, color sense different from that of the above image may be felt when the three lightings have the same luminous intensity. Consequently, the controller 658 may control the luminous intensities of the G lighting and the B lighting to be lowered according to the distribution ratio based on the luminous intensity of the R color, which is the most distributed. In this case, better effects may be provided. Alternatively, the R, G, and B data may be appropriately arranged in time order or based on a PWM signal, or a combination of the R, G, and B data corresponding to the color sense data may be transmitted in time order while being synchronized by the PWM signal.

Meanwhile, in a case in which the controller 658 simultaneously controls four or more flat type lightings together with or independently from the above description, the controller 658 may assign appropriate colors to the respective lightings based on the color sense distribution of the data such that appropriate effects can be provided.

Also, in a case in which the controller 658 assigns one color (for example, the most distributed color) to the respective flat type lightings, the controller 658 may control even the same color to have different luminous intensities according to the arrangement such that similar effects can be provided.

Also, the controller 658 may control one flat type lighting or a plurality of flat type lightings using a single color pattern. In addition, the controller 658 may apply different color patterns to the respective flat type lightings or may apply a combination of the three color patterns to the respective flat type lightings. What color pattern is to be applied may be automatically decided. Alternatively, what color pattern is to be applied may be preset or decided according to user input.

Meanwhile, all contents related to generation of the color patterns and the lighting control color sense data may be performed by the controller of the lighting apparatus, not the mobile device. Alternatively, data related to color sense may be extracted by the mobile device, and decision of the color pattern and generation of pattern values, i.e. lighting control color sense data, may be performed by the controller of the lighting apparatus. Alternatively, both the mobile device and the lighting apparatus may generate color sense data, the color sense data generated by the mobile device and the color sense data generated by the lighting apparatus may be compared, and an average value may be applied according to the comparison result.

Meanwhile, each color pattern unit may correspond to one dot or a plurality of dots of an image. Also, in configuring color sense data regarding an image, the image and the flat type lighting may be compared, the image may be appropriately resized and converted, and a color pattern unit may be configured differently from the previous color pattern unit based on the converted image.

In order for the respective light emitting units of each flat type lighting or the respective flat type lightings to have different color senses, for example, the amount of current introduced into the respective light emitting units of each flat type lighting or the respective flat type lightings may be adjusted based on the color sense data. Meanwhile, the lighting apparatus or the mobile devices may previously construct a table regarding the amount of current and the color sense data such that the lighting can be more rapidly and easily controlled.

Also, as previously described, the mobile device or the lighting apparatus may previously configure and store an image and lighting control color sense data on the image. Consequently, it is possible to previously control the lighting apparatus to have appropriate luminous intensity at appropriate time through a schedule function.

In addition, even in a case in which an image is not captured by a user but is merely focused using a camera, for example, the above process may be performed, a mode based on the previously stored lighting control color sense data may be provided according to the user's request, the lighting may be automatically controlled according to the mode, or the lighting control color sense data may be recommended according to the user's request. Particularly in the latter case, the mobile device or the lighting apparatus, which is capable of recognizing sensitivity, may determine surroundings, time, or sound to automatically apply or recommend appropriate lighting control color sense data.

FIG. 18 is a view showing an embodiment in which color sense is reproduced according to a lighting control method. Specifically, FIG. 18(a) shows a state before lighting control is performed, and FIG. 18(b) shows a state after lighting control is performed.

Hereinafter, a lighting control method will be described with reference to a flowchart.

One example of the lighting control method may include a step of receiving an image, a step of extracting color sense pattern data of the image in a predetermined unit to generate lighting control color sense data, a step of deciding a light source of a lighting emitting unit corresponding to the predetermined unit of the received data based on the generated lighting control color sense data, and a step of controlling a corresponding lighting emitting unit using the light source decided based on the lighting control color sense data. The lighting control method may further include a step of reconfiguring the received image such that the received image corresponds to a lighting apparatus.

Meanwhile, the lighting control color sense data may be generated using at least one of a mosaic pattern processing method, a gradation pattern processing method, a color percentage pattern processing method, or another appropriate method. Also, the lighting control method may further include a step of assigning a mosaic interval pixel size to the reconfigured image, a step of extracting RGB values into the assigned pixel size unit, and a step of generating pixels having the extracted RGB values. Also, the lighting control method may further include a step of generating a mosaic image, a step of selecting at least one color within a color range, and a step of generating gradation based on the selected at least one color.

Alternatively, the lighting control method may further include a step of generating a mosaic image, a step of calculating percentages of a red color (R), a green color (G), and a blue color (B), and a step of distinguishing a color having the highest percentage from the colors having the calculated percentages and deducing an average of the colors. The predetermined unit may be a dot unit, and the color sense pattern data and/or the lighting control color sense data may include color temperature and/or luminous intensity. Moreover, the image may be received from a lighting control device and/or an external device. In addition, the lighting unit may include flat type lighting.

FIGS. 19 to 22 are flowcharts showing embodiments of an image processing method for color sense reproduction. Hereinafter, image processing methods for color sense control will be described as individual embodiments. Alternatively, the individual embodiments may be combined to process an image for color sense control.

FIG. 19 is a flowchart showing an example of a color sense control method of the lighting control device. When a user selects or photographs an image, in step S1902, the lighting control device determines whether the selected or photographed image is to be used for lighting control, in step S1904. The image may be selected from a photo gallery in the lighting control device. Meanwhile, photographing also includes capturing or focusing a motion image or a still image in addition to photographing the motion image or the still image. In case of focusing, a focus factor, such as a rectangular box, according to user selection may be used.

Upon determining at step S1904 that the corresponding image is to be used for lighting control, the lighting control device may determine and select what lighting control pattern, e.g., what color sense pattern, is to be applied to the image, in step S1906.

The lighting control device may generate color pattern values, e.g., lighting control color sense data, according to the color sense pattern selected at step S1906, in step S1908, and may transmit a control signal containing the generated lighting control color sense data to a corresponding lighting apparatus through the RF transmission unit, in step S1910.

The corresponding lighting apparatus may extract the lighting control color sense data from the received control signal and control a light emitting unit based on the extracted lighting control color sense data to output color sense identical or similar to the selected image.

FIG. 20 is a flowchart showing an example of a lighting apparatus control method using a mosaic pattern processing method. The mobile device may crop or resize a selected or photographed image, in step S2002, and set a mosaic interval pixel size, in step S2004. At this time, the setting performed at step S2004 may be performed with reference to the width of the image, the number of LED elements in the horizontal direction, the height of the image, and the number of the LED elements in the vertical direction.

The mobile device may extract RGB values in unit of the pixel size set at step S2004, in step S2006. The mobile device may generate pixels having the RGB values extracted at step S2006, in step S2008.

The above process may be performed with respect to each of the pixels assigned to the cropped or resized image such that the light emitting unit of the flat type lighting corresponding to the respective pixels or the flat type lighting corresponding to the respective pixels outputs various color senses.

FIG. 21 is a flowchart showing an example of a lighting apparatus control method using a gradation pattern processing method. The mobile device may generate a mosaic image with respect to a selected or photographed image in a manner similar to in FIG. 20, in step S2102. The mobile device may select a first color and a second color within a color range, in steps S2104 and S2106, respectively, and generate a gradation using the selected first color and the selected second color, in step S2108. The mobile device may uniformly apply the generated gradation to each mosaic image or all mosaic images to control color sense of the lighting apparatus.

In this embodiment, the two colors are selected from the selected color range. Alternatively, all colors within the color range may be selected, or at least one color may be used to generate gradation. Such selection may be decided based on power consumption or remaining battery power of a corresponding mobile device.

FIG. 22 is a flowchart showing an example of a lighting apparatus control method using a color percentage pattern processing method. The mobile device may generate a mosaic image in the same manner as in step S2102 as described above, in step S2202, and calculate percentages of a red color (R), a green color (G), and a blue color (B), in steps S2204, S2206, and S2208, respectively.

The mobile device may compare the calculated percentages of the respective colors, in step S2210, to distinguish a color having the highest percentage, in step S2212. Subsequently, the mobile device may deduce a color average of the color having the highest percentage and control the lighting apparatus using the deduced color average of the deduced color, in step S2214.

Meanwhile, in FIGS. 19 to 22, the mobile device may be replaced by a lighting apparatus. The pattern processing methods are individually used as shown in FIGS. 20 to 22. However, two or more of the pattern processing methods may be combined to control the lighting apparatus. Also, in the above cases, the mosaic image generation step may not be required, and the above processes may be performed based on points or dots selected by a user.

Meanwhile, the lighting apparatus may individually control the respective light emitting units based on the number of the light emitting units for color sense control required through the lighting control device. For example, in a case in which color sense is to be reproduced through a plurality of light emitting units, the same color sense control data may be provided to all of the light emitting units such that each of the light emitting units reproduce the color sense. Alternatively, individually generated color sense data may be transmitted to some or all of the light emitting units in consideration of at least one factor selected from among a plurality of factors, including, for example, the request of the lighting control device, the number of the light emitting units used to reproduce color sense, the positions of the light emitting units, a space in which color sense is reproduced or the attribute of the space, luminous intensity in the current space, such as a room, e.g., indoor luminous intensity, outdoor luminous intensity, or another appropriate factor.

The lighting apparatus may be controlled to provide color sense similar to natural color sense, such as sunrise, sunset, and a glow in the sky, thereby inducing mental stability and comfort of users. Also, it is possible to easily and conveniently perform lighting control. According to circumstances, an indoor space may be seen as being widened, or a new atmosphere may be naturally produced.

As can be seen from the above description, it is possible to control the lighting apparatus to provide a lighting effect similar to an image, such as an impressive colors of the sky and a glow in the sky. Also, it is possible to easily and similarly express various impressive color senses, such as various color senses required by users, through the above lighting apparatus and the above lighting control method, thereby improving user's satisfaction and convenience.

As described above, it is possible to conveniently control the lighting apparatus connected to the lighting control device via the network using the lighting control device. Also, it is possible to accurately control the color temperature, dimming, and color sense as well as power in stages or at once through the interface of the lighting control device. In addition, it is possible to greatly improve convenience and product satisfaction of users through the lighting system including the lighting apparatus and the lighting control device.

Furthermore, the lighting control device may be linked to the lighting apparatus to perform various functions. For example, as previously described, it is possible for the lighting control device to adjust dimming and color temperature through motion or touch. In addition, it is also possible for the lighting control device to adjust a color sense (color scheme). Meanwhile, in a case in which the color sense is controlled, the lighting control device may be linked to a user motion or touch after the color sense is selected such that the dimming or the color temperature can be adjusted in the vertical direction or in the horizontal direction. In conclusion, it is possible to adjust color sense data through user touch or motion. In addition, it is possible to simultaneously control dimming or color temperature as well as color sense data through an additional motion or touch and drag after the user touch or motion.

Also, when a lighting control application is executed, the lighting control device may output icons of all or some of the lighting apparatuses available from the current position on a screen of the lighting control device (or another digital device connected to the lighting control device), select an icon corresponding to a desired one of the lighting apparatuses, and freely control dimming, color temperature, and color sense through the above-mentioned motion and touch.

As described above, the lighting control device may control power on/off, color sense, dimming, and color temperature of a desired lighting apparatus through the lighting control application in real time. In addition, the above control may be performed according to a prescribed schedule. In this case, the color sense, the dimming, and the color temperature may not be directly applied when the lighting control device is turned on/off but may be smoothly or gradually controlled when the lighting control device is turned on/off. For example, in a case in which the lighting control device is turned on/off, dimming, color sense, and color temperature are controlled. In the morning or when the difference between the luminous intensity of the lighting apparatus and the luminous intensity of the surroundings exceeds a predetermined level, the dimming, the color sense, and the color temperature may be smoothly processed to minimize stimulation to the eyes or discomfort to the user.

Also, if a user selects a specific point or range within an image when color sense data are generated by the lighting control device or the controller of the lighting apparatus, a GUI regarding color sense data may be configured to provide RGB percentages of the selected point or range. In this case, information regarding luminous intensity of the surroundings, dimming, or color temperature may also be provided, and information regarding RGB percentages may be recommended in addition to the above information. Consequently, it is possible to provide color sense similar to the color sense of the original image irrespective of the difference in background, position, time, and luminous intensity between the image and a real place.

Meanwhile, as previously described, the lighting control device may recognize touch and drag inputs, and therefore, it is possible to control a range of color sense change or the change of color sense at pixels in an image through the touch and drag inputs. For example, in a case in which, on an image of a cloudy sky, a user touches a sky having a blue color sense as a point and releases the point to a cloud having a white color sense through the drag input, the color sense of the lighting apparatus may be continuously changed from the blue color sense to the white color sense. This may be repeated for a time set by the user or number of times set by the user. Also, the lighting apparatus may alternately provide the blue color sense and the white color sense in time order or appropriately generate color sense data regarding other color senses present between the above color senses to achieve a smooth transition.

Also, even in a case in which the lighting control device does not select an image but selects a region of a motion image, it is possible for the lighting apparatus to perform color sense control. For example, the lighting control device or the controller of the lighting apparatus may extract data regarding color sense data of a region selected from frames constituting the motion image and configure the extracted data as color sense data to be reproduced in the lighting apparatus in a manner as previously described. Also, the lighting control device or the controller of the lighting apparatus may provide the configured color sense data to the respective light emitting units based on the running time of the motion image or the number of the frames such that a color sense similar to that in the motion image can be reproduced. Meanwhile, in a case in which the selected region of the motion image includes a plurality of pixels, color sense data may be configured in the respective pixels using at least one selected from the methods shown in FIGS. 19 to 22.

In addition, color sense data of images selected based on certain time periods or time zones, such as morning, afternoon, and evening, and/or days of the week through the lighting control device may be previously stored, and then color sense data of images may be provided on corresponding time periods, time zones and/or days of the week. Meanwhile, images used for color sense reproduction are not limited to images or motion images stored in the lighting control device. Images used for color sense reproduction may be received from other digital devices or servers connected to the lighting control device.

Meanwhile, the lighting apparatus may store and use favorite color sense configuration data for each user. For example, assume that user A configures color sense data using a color sense of sky blue, and user B configures color sense data using a color sense of pink. When user A returns home, a mobile device, e.g., a lighting control device, of user A may pair with the lighting apparatus such that the lighting apparatus can be immediately applied. In this case, the lighting control device may be previously registered such that the lighting control device can be used although a lighting control application is not executed in the lighting control device. Meanwhile, in a case in which another person different from user A or user B breaks into the house, or the corresponding lighting apparatus searches a mobile device of the person, color sense data previously configured to prepare for such a case may be reproduced. As an example of the previously configured color sense data, light containing red indicating warning may be blinked such that user A or user B can easily recognize such a situation.

Meanwhile, although not shown, in addition to motion or touch of the lighting control device, voice or gesture of a user may be recognized through a camera or speaker included in the lighting control device, a peripheral digital device or other equipment that can be paired with the lighting control device or the lighting apparatus, and which includes a sensor or chip capable of transmitting and receiving data. Here, it is possible to control power on/off, dimming, and color temperature of the lighting apparatus and to reproduce color sense data using the device. For example, a user may input a voice for dimming control through an audio receiving unit of the lighting control device to control a dimming level of the corresponding lighting apparatus.

Alternatively, in a case in which a user takes a predetermined gesture while wearing a glove having a module paired with the lighting control device such that the module communicates with the lighting control device or having a predetermined apparatus paired with the lighting control device so as to communicate with the lighting control device, data regarding the user's gesture may be generated, and the generated data may be interlocked with lighting control functions to control lighting based on the user's gesture. In addition, the user's gesture recognized through a camera of the lighting control device may be analyzed, and the analyzed gesture data may be interlocked with control functions of the lighting apparatus to control the lighting apparatus based thereupon.

As broadly described and embodied herein, a lighting system may include a mobile terminal, a hub configured to communicate with the mobile terminal, and an LED lamp configured to communicate with the hub, wherein the mobile terminal is configured to display an image captured or focused using a camera at the mobile terminal, and transfers to the hub information corresponding to a selection of a region of the image, and the hub provides a wireless signal corresponding to the information received from the mobile terminal for changing a color of light emitted by the LED lamp.

The information may be transferred to the hub includes information for changing a brightness or color temperature of the light emitted by the LED lamp. The information may correspond to a level of a prescribed color based on the selected region of the image. The information may be based on a mosaic, gradation, or color percentage of the selected region of the image.

Moreover, the wireless signal may be a control signal based on the ZigBee protocol. The information transferred to the hub may be a control signal based on the ZigBee protocol. The mobile terminal may be configured to communicate with the hub according to the TCP/IP protocol. The hub may be configured to communicate with the lighting apparatus according to the ZigBee protocol. Moreover, the mobile terminal may be configured to communicate with the lighting apparatus according to the ZigBee protocol. In this embodiment, the mobile terminal may be a smart phone.

In one embodiment, a hub for a lighting system may include a data port for receiving data from a mobile device, an antenna for transmitting signals to an LED lamp, and a controller configured to generate wireless signals for controlling the LED lamp, wherein the controller receives information corresponding to a selection of a region of an image captured or focused using a camera at the mobile device, generates the signals based on the received information, and transmits the signals corresponding to the information received from the mobile device for changing a color of light emitted by the LED lamp.

In one embodiment, an LED bulb may include a lens, at least one LED provided on a substrate, a heat sink configured to dissipate heat generated by the LEDs, a wireless communication module, and a controller configured to control a color of light emitted by the LEDs, wherein the controller receives through the wireless communication module information corresponding to a selection of a region of an image captured or focused using a camera at the mobile device, and controls the LEDs to emit a color based on the received information.

In one embodiment, a mobile device for controlling a lighting apparatus may include a touch screen, a wireless communication interface, and a controller configured to control a display of an image captured or focused using a camera at the mobile device, detect a selection of a region of the image, generate information corresponding to the selection for changing a color of light emitted by a lighting apparatus, and wirelessly transfer the information.

In one embodiment, a lighting control module for plugging into a mobile device may include a body, a connector for connecting the body to a mobile device, and a wireless communication interface for communicating with a lighting apparatus, wherein the lighting control module is configured to receive through the connector information based on an input at the mobile device, provide a wireless signal corresponding to the received information for changing at least one of a power, brightness, color, or color temperature of a lighting apparatus, and transmit the signal to the lighting apparatus.

As is apparent from the above description, the present disclosure has the following effects.

First, it is possible to control a lighting apparatus connected via a wired/wireless network using an available peripheral input device in addition to a predetermined control means.

Second, it is possible to easily and conveniently control the lighting apparatus through a motion or touch of the input device without performing several complex processes.

Third, it is possible to provide a feedback according to a control command during controlling of the lighting apparatus through the input device, thereby improving user's convenience in lighting control.

Fourth, it is possible to control the lighting apparatus based on an image focused or input through the input device such that the lighting apparatus has lighting effects identical or similar to the image.

Fifth, it is possible to control dimming, color temperature, and color sense of the lighting apparatus according to request or intention of a user through the input device, thereby improving user's satisfaction and convenience.

Sixth, it is possible to provide a lighting system including the input device and the lighting apparatus.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting system comprising:
   a mobile terminal;
   a hub configured to communicate with the mobile terminal; and
   an LED lamp configured to illuminate a lighting field and communicate with the hub,
   wherein the mobile terminal is configured to display an image outside the lighting field captured or focused using a camera at the mobile terminal, and transfers to the hub information corresponding to a selection of a region of the image,
   wherein the hub provides a wireless signal corresponding to the information received from the mobile terminal for changing a color of light emitted by the LED lamp,
   wherein the mobile terminal includes a controller generating the information including lighting control color sense data, and decides a number of LEDs of the LED lamp and controls the LEDs based on the lighting control color sense data,
   wherein the light control color sense data is based on a mosaic, gradation, or color percentage of the selected region of the image, and
   wherein the controller is configured to crop or resize the image to generate a stored image and set a mosaic interval pixel size, extract RGB values in unit of the pixel size, and generate pixels having the extracted RGB values for transfer to the hub and for controlling the LED lamp.

2. The lighting system of claim 1, wherein the information transferred to the hub includes information for changing a brightness or color temperature of the light emitted by the LED lamp.

3. The lighting system of claim 1, wherein the information corresponds to a level of a prescribed color based on the selected region of the image.

4. The lighting system of claim 1, wherein the wireless signal is a control signal based on the ZigBee protocol.

5. The lighting system of claim 1, wherein the information transferred to the hub is a control signal based on the ZigBee protocol.

6. The lighting system of claim 1, wherein the mobile terminal is configured to communicate with the hub according to the TCP/IP protocol.

7. The lighting system of claim 1, wherein the hub is configured to communicate with the LED lamp according to the ZigBee protocol.

8. The lighting system of claim 1, wherein the mobile terminal is configured to communicate with the LED lamp according to the ZigBee protocol.

9. The lighting system of claim 1, wherein the mobile terminal is a smart phone.

10. The lighting system of claim 1, wherein the controller is configured to assign the mosaic interval pixel size based on a size of the image and a number of LEDs.

* * * * *